(12) United States Patent
Prahlad et al.

(10) Patent No.: US 8,352,432 B2
(45) Date of Patent: Jan. 8, 2013

(54) SYSTEMS AND METHODS FOR NORMALIZING DATA OF HETEROGENEOUS DATA SOURCES

(75) Inventors: Anand Prahlad, Bangalore (IN); Parag Gokhale, Marlboro, NJ (US); Rajiv Kottomtharayil, Marlboro, NJ (US); Jun Lu, Tinton Falls, NJ (US); Rahul S. Pawar, Marlboro, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 64 days.

(21) Appl. No.: 12/749,897

(22) Filed: Mar. 30, 2010

(65) Prior Publication Data

US 2010/0332561 A1  Dec. 30, 2010

Related U.S. Application Data

(60) Provisional application No. 61/165,095, filed on Mar. 31, 2009.

(51) Int. Cl.
*G06F 7/00* (2006.01)
*G06F 17/00* (2006.01)

(52) U.S. Cl. ........ 707/640; 707/644; 707/651; 711/161; 711/162

(58) Field of Classification Search ........................ None
See application file for complete search history.

(56) References Cited

U.S. PATENT DOCUMENTS

| | | | |
|---|---|---|---|
| 4,084,231 A | 4/1978 | Capozzi et al. | |
| 4,267,568 A | 5/1981 | Dechant et al. | |
| 4,283,787 A | 8/1981 | Chambers | |
| 4,417,321 A | 11/1983 | Chang et al. | |
| 4,641,274 A | 2/1987 | Swank | |
| 4,654,819 A | 3/1987 | Stiffler et al. | |

(Continued)

FOREIGN PATENT DOCUMENTS

AU        2004227949         8/2010

(Continued)

OTHER PUBLICATIONS

Luis-Felipe Cabrera, et al. "ADSM: A Multi-Platform, Scalable, Backup and Archive Mass Storage System", Digest of Papers of the Computer Society Computer Conference (Spring) Compeon, US, Los Alamitos, IEEE Comp. Soc. Press, vol. Conf. (Mar. 5, 1995), pp. 420-427.

(Continued)

*Primary Examiner* — Angelica Ruiz
(74) *Attorney, Agent, or Firm* — Knobbe Martens Olson & Bear LLP

(57) ABSTRACT

Systems and methods integrate disparate backup devices with a unified interface. In certain examples, a management console manages data from various backup devices, while retaining such data in its native format. The management console can display a hierarchical view the client devices and/or their data and can further provide utilities for processing the various data formats. A data structure including fields for storing both metadata common to the client device data and value-added metadata can be used to mine or process the data of the disparate client devices. The unified single platform and interface reduces the need for multiple data management products and/or customized data utilities for each individual client device and provides a single pane of glass view into data management operations. Integrating the various types of storage formats and media allows a user to retain existing storage infrastructures and further facilitates scaling to meet long-term management needs.

16 Claims, 20 Drawing Sheets

U.S. PATENT DOCUMENTS

| | | |
|---|---|---|
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 6,792,466 B1 | 9/2004 | Saulpaugh et al. |
| 7,003,641 B2 | 2/2006 | Prahlad et al. |
| 7,035,880 B1 | 4/2006 | Crescenti et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,209,972 B1 | 4/2007 | Ignatius et al. |
| 7,246,207 B2 | 7/2007 | Kottomtharayil et al. |
| 7,315,923 B2 | 1/2008 | Retnamma et al. |
| 7,315,924 B2 | 1/2008 | Prahlad et al. |
| 7,380,072 B2 | 5/2008 | Kottomtharayil et al. |
| 7,389,311 B1 | 6/2008 | Crescenti et al. |
| 7,395,282 B1 | 7/2008 | Crescenti et al. |
| 7,401,154 B2 | 7/2008 | Ignatius et al. |
| 7,409,509 B2 | 8/2008 | Devassy et al. |
| 7,412,518 B1 | 8/2008 | Duigou et al. |
| 7,440,982 B2 | 10/2008 | Lu et al. |
| 7,447,692 B2 | 11/2008 | Oshinsky et al. |
| 7,454,569 B2 | 11/2008 | Kavuri et al. |
| 7,484,054 B2 | 1/2009 | Kottomtharayil et al. |
| 7,490,207 B2 | 2/2009 | Amarendran et al. |
| 7,500,053 B1 | 3/2009 | Kavuri et al. |
| 7,526,202 B2* | 4/2009 | Ovadia et al. .................. 398/51 |
| 7,536,291 B1 | 5/2009 | Vijayan Retnamma et al. |
| 7,543,125 B2 | 6/2009 | Gokhale |
| 7,546,323 B1 | 6/2009 | Timmins et al. |
| 7,546,324 B2 | 6/2009 | Prahlad et al. |
| 7,581,077 B2 | 8/2009 | Ignatius et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,739,459 B2 | 6/2010 | Kottomtharayil et al. |
| 7,747,579 B2 | 6/2010 | Prahlad et al. |
| 7,757,043 B2 | 7/2010 | Kavuri et al. |
| 7,769,961 B2 | 8/2010 | Kottomtharayil et al. |
| 7,801,864 B2 | 9/2010 | Prahlad et al. |
| 7,802,067 B2 | 9/2010 | Prahlad et al. |
| 7,809,914 B2 | 10/2010 | Kottomtharayil et al. |
| 7,904,428 B2* | 3/2011 | Perry et al. .................. 707/677 |
| 2002/0174098 A1 | 11/2002 | Wu et al. |
| 2004/0234263 A1* | 11/2004 | Ovadia et al. .................. 398/51 |
| 2005/0066118 A1* | 3/2005 | Perry et al. .................. 711/112 |
| 2006/0123189 A1 | 6/2006 | Bitner et al. |
| 2008/0133624 A1 | 6/2008 | Phillips et al. |
| 2008/0228785 A1 | 9/2008 | Kavuri et al. |
| 2008/0307000 A1 | 12/2008 | Paterson et al. |
| 2009/0019367 A1* | 1/2009 | Cavagnari et al. ............ 715/716 |
| 2009/0031255 A1* | 1/2009 | Kidd .............................. 715/845 |
| 2010/0179940 A1* | 7/2010 | Gilder et al. .................. 707/622 |
| 2010/0332453 A1 | 12/2010 | Prahlad et al. |
| 2010/0332561 A1 | 12/2010 | Prahlad et al. |
| 2010/0332990 A1 | 12/2010 | Prahlad et al. |

FOREIGN PATENT DOCUMENTS

| | | |
|---|---|---|
| CA | 2498174 | 4/2010 |
| DE | 69415115.7 | 9/1998 |
| DE | 60020978.4 | 6/2005 |
| EP | 0259912 | 3/1988 |
| EP | 0405926 | 1/1991 |
| EP | 0467546 | 1/1992 |
| EP | 0645709 | 9/1994 |
| EP | 0774715 | 5/1997 |
| EP | 0809184 | 11/1997 |
| EP | 541281 | 4/1998 |
| EP | 0899662 | 3/1999 |
| EP | 0981090 | 2/2000 |
| EP | 1204922 | 7/2000 |
| EP | 1393181 | 1/2001 |
| EP | 1384135 | 7/2010 |
| GB | 2410106 | 9/2006 |
| GB | 2409553 | 4/2007 |
| GB | 2425199 | 8/2007 |
| GB | 2435756 | 12/2008 |
| GB | 2447361 | 5/2009 |
| IN | 226655 | 12/2008 |
| IN | 234083 | 5/2009 |
| IN | 234518 | 6/2009 |
| JP | 4198050 | 10/2008 |
| JP | 4267443 | 2/2009 |
| MX | 254554 | 2/2008 |
| WO | WO 9513580 | 5/1995 |
| WO | WO 9912098 | 3/1999 |

OTHER PUBLICATIONS

Mendel Rosenblum Operating Systems Review (SIGOPS), vol. 25, No. 5, May 1991, New York, US, "The Design and Implementation of a Log-Structured File System", p. 4, paragraph 3.3-p. 5.

IBM Technical Disclosure Bulletin, vol. 24, No. 5, Oct. 1981 New York, US, pp. 2404-2406, K.L. Huff, "Data Set Usage Sequence Number".

David A. Arneson, "Mass Storage Archiving in Network Environments"; IEEE; Oct. 31-Nov. 1988; pp. 45-80.

Eitel, "Backup and Storage Management in Distributed Heterogenerous Environments", IEEE, 1994, pp. 124-126.

International Search Report, PCT/US2010/029267, dated Jan. 6, 2010.

* cited by examiner

```xml
</xml version="1.0" encoding="UTF-8" standalone="no" />
<App_ClientList>
 <clients>
  <client clientPassword="2" cvdPort="8600" evmgrcPort="8602" installDirectory="C:\Program Files\NetApp\SnapManager for Exchange">
   <clientEntry_type_="3" clientName="vex2k3" hostName="vex2k3.vex.net" type="0" />
   <osInfo SubType="Server" Type="WINDOWS" Version="5.2" osId="34" >
    <OsDisplayInfo OSName="Windows server 2003" />
   </osInfo>
   <components installDir="C:\Program Files\NetApp\SnapManager for Exchange" >
    <entityType_type_="1" />
   </components>
   <components installDir="C:\Program Files\NetApp\SnapManager for Exchange" >
    <entityType_type_="3" />
   </components>
   <components installDir="C:\Program Files\NetApp\SnapManager for Exchange" >
    <entityType_type_="4" />
   </components>
   <idaList status="0" >
    <idaEntity_type_="4" appName="Exchange Database" applicationId="53" type="0" />
    <instanceList>
     <instEntity_type_="5" instanceName="DefaultInstanceName_Exchange" type="0" />
     <backupSetList>
      <backupSetEntity_type_="6" backupsetName="defaultBackupSet_External" type="0" />
      <subClientList>
       <subClientEntity_type_="7" subclientName="default" type="0" />
       <propertyList modifyTime="1268083438" value="Microsoft Information Store\Manas_SG\Store-2nd" value="Microsoft++1Information+1Store 0 nothing nothing 0" valueType="112" />
       <filterList modifyTime="1268083438" value="Microsoft Information Store\Manas_SG\Store-2nd" name="Manas_SG\Store-2nd" value="Microsoft++1Information+1Store 0 nothing nothing 0" valueType="1" />
       <dataStoragePolicy_type_="1" storagePolicyName="CCM_VEX2K3_NetApp_CommCell" />
       <logStoragePolicy_type_="17" storagePolicyName="CCM_VEX2K3_NetApp_CommCell" />
      </subClientList>
     </backupSetList>
    </instanceList>
   </idaList>
  </client>
  <server password="" serverVendor="102" timeZone="(GMT-05:00) Eastern Time (US & Canada)" >
   <serverEntity_type_="1" commCellName="VEX2K3_NetApp_CommCell" type="2" >
    <flags deleted="0" disabled="0" excluded="0" included="0" />
   </serverEntity>
  </server>
 </clients>
</App_ClientList>
```

FIG. 2A

```xml
<?xml version="1.0" encoding="UTF-8" standalone="no" ?>
<FDC_Joblist>
- <jobs appId="53" nativeJobId="1265737880">
    <commcell_type_="1" commCellName="VEX2K3_NetApp_CommCell" type="0" />
    <source_type_="7" appName="Exchange Database" applicationId="53" backupsetName="defaultBackupSet_External"
     clientName="vex2k3" commCellName="VEX2k3_NetApp_CommCell" instanceName="DefaultInstanceName_Exchange"
     subclientName="default" type="0" />
    <stat category="1" status="1" />
  <backupStat>
-   <backupOpt backUpLevel="1" displayStatus="1" operationType="65" startDate="1265737880" >
      <datastoragePolicy_type_="17" storagePolicyName="CCM_VEX2K3_NetApp_CommCell" />
      <logstoragePolicy_type_="17" storagePolicyName="CCM_VEX2K3_NetApp_CommCell" />
    </backupOpt>
  </backupStat>
</jobs>
- <jobs appId="53" nativeJobId="1266013605" >
    <commcell_type_="1" commCellName="VEX2K3_NetApp_CommCell" type="0" />
    <source_type_="7" appName="Exchange Database" applicationId="53" backupsetName="defaultBackupSet_External"
     clientName="vex2k3" commCellName="VEX2k3_NetApp_CommCell" instanceName="DefaultInstanceName_Exchange"
     subclientName="default" type="0" />
    <stat category="1" status="1" />
  <backupStat>
-   <backupOpt backUpLevel="1" displayStatus="1" operationType="65" startDate="1266013605" >
      <datastoragePolicy_type_="17" storagePolicyName="CCM_VEX2K3_NetApp_CommCell" />
      <logstoragePolicy_type_="17" storagePolicyName="CCM_VEX2K3_NetApp_CommCell" />
    </backupOpt>
  </backupStat>
</jobs>
- <jobs appId="53" nativeJobId="1267136274" >
    <commcell_type_="1" commCellName="VEX2K3_NetApp_CommCell" type="0" />
    <source_type_="7" appName="Exchange Database" applicationId="53" backupsetName="defaultBackupSet_External"
     clientName="vex2k3" commCellName="VEX2k3_NetApp_CommCell" instanceName="DefaultInstanceName_Exchange"
     subclientName="default" type="0" />
    <stat category="1" status="1" />
  <backupStat>
```

```xml
- <backupOpt backUpLevel="1" displayStatus="1" operationType="65" startDate="1267113624" >
    <datastoragePolicy_type_="17" storagePolicyName="CCM_VEX2K3_NetApp_CommCell" />
    <logstoragePolicy_type_="17" storagePolicyName="CCM_VEX2K3_NetApp_CommCell" />
  </backupOpt>
  </jobs>
- <jobs applId="53" nativeJobId="1267137590" >
    <commcell_type_="1" commCellName="VEX2K3_NetApp_CommCell" type="0" />
    <source_type_="7" appName="Exchange Database" applicationId="53" backupsetName="defaultBackupSet_External"
      clientName="vex2k3" commCellName="VEX2K3_NetApp_CommCell" instanceName="DefaultInstanceName_Exchange"
      subclientName="default" type="0" />
    <stat category="1" status="1" />
  <backupStat>
- <backupOpt backUpLevel="1" displayStatus="1" operationType="65" startDate="1267137590" >
    <datastoragePolicy_type_="17" storagePolicyName="CCM_VEX2K3_NetApp_CommCell" />
    <logstoragePolicy_type_="17" storagePolicyName="CCM_VEX2K3_NetApp_CommCell" />
  </backupOpt>
  </backupStat>
  </jobs>
- <jobs applId="53" nativeJobId="1267201085" >
    <commcell_type_="1" commCellName="VEX2K3_NetApp_CommCell" type="0" />
    <source_type_="7" appName="Exchange Database" applicationId="53" backupsetName="defaultBackupSet_External"
      clientName="vex2k3" commCellName="VEX2K3_NetApp_CommCell" instanceName="DefaultInstanceName_Exchange"
      subclientName="default" type="0" />
    <stat category="1" status="1" />
  <backupStat>
- <backupOpt backUpLevel="1" displayStatus="1" operationType="65" startDate="1267201085" >
    <datastoragePolicy_type_="17" storagePolicyName="CCM_VEX2K3_NetApp_CommCell" />
    <logstoragePolicy_type_="17" storagePolicyName="CCM_VEX2K3_NetApp_CommCell" />
  </backupOpt>
  </backupStat>
  </jobs>
- <jobs applId="53" nativeJobId="1268078992" >
    <commcell_type_="1" commCellName="VEX2K3_NetApp_CommCell" type="0" />
    <source_type_="7" appName="Exchange Database" applicationId="53" backupsetName="defaultBackupSet_External"
      clientName="vex2k3" commCellName="VEX2K3_NetApp_CommCell" instanceName="DefaultInstanceName_Exchange"
      subclientName="default" type="0" />
```

```xml
      <stat category="1" status="1" />
    </backupStat>
    <backupOpt backUpLevel="1" displayStatus="1" operationType="65" startDate="1268078992" >
      <datastoragePolicy_type_="17" storagePolicyName="CCM_VEX2K3_NetApp_CommCell" />
      <logstoragePolicy_type_="17" storagePolicyName="CCM_VEX2K3_NetApp_CommCell" />
    </backupOpt>
  </jobs>
- <jobs appId="53" nativeJobId="1268082983" >
    <commcell_type_="1" commCellName="VEX2K3_NetApp_CommCell" type="0" />
    <source_type_="7" appName="Exchange Database" applicationId="53" backupsetName="defaultBackupSet_External"
      clientName="vex2k3" commCellName="VEX2K3_NetApp_CommCell" instanceName="DefaultInstanceName_Exchange"
      subclientName="default" type="0" />
    <stat category="1" status="1" />
    </backupStat>
    <backupOpt backUpLevel="1" displayStatus="1" operationType="65" startDate="1268082983" >
      <datastoragePolicy_type_="17" storagePolicyName="CCM_VEX2K3_NetApp_CommCell" />
      <logstoragePolicy_type_="17" storagePolicyName="CCM_VEX2K3_NetApp_CommCell" />
    </backupOpt>
  </jobs>
- <jobs appId="53" nativeJobId="1268083439" >
    <commcell_type_="1" commCellName="VEX2K3_NetApp_CommCell" type="0" />
    <source_type_="7" appName="Exchange Database" applicationId="53" backupsetName="defaultBackupSet_External"
      clientName="vex2k3" commCellName="VEX2K3_NetApp_CommCell" instanceName="DefaultInstanceName_Exchange"
      subclientName="default" type="0" />
    <stat category="1" status="1" />
    </backupStat>
    <backupOpt backUpLevel="1" displayStatus="1" operationType="65" startDate="1268083439" >
      <datastoragePolicy_type_="17" storagePolicyName="CCM_VEX2K3_NetApp_CommCell" />
      <logstoragePolicy_type_="17" storagePolicyName="CCM_VEX2K3_NetApp_CommCell" />
    </backupOpt>
  </jobs>
</FDC_JobList>
```

```xml
<?xml version="1.0" encoding="UTF-8" standalone="no" ?>
<FDC_SnapList>
  <jobs appTypeId="53" clientName="vex2k3" commCellName="VEX2K3_NetApp_CommCell" nativeJobId="1265737880"
   subclientName="default" >
    <snaps totalSnap="2" >
      <snap CreationTime="1265737880" name="eloginfo_vex2k3_02-09-2010-12.51.20" >
        <VolumeInfo SourceGUID="\\?\Volume{43405dca-e36d-4114-a5ef-4097cbc1b44}" SourcePath="H:\"
         VolumeName="vex2k3" />
        <SnapInfo FilerName="avocado" FilerPath="/vol/vex2k3/disk2" SnapSourceDevice="\\.\PhysicalDrive2"
         UniqueIdentifier="eloginfo__vex2k3_02-09-2010_12.51.20" />
      </snap>
      <snap CreationTime="1265737880" name="exchsnap__vex2k3_02-09-2010_12.51.20" >
        <VolumeInfo SourceGUID="\\?\Volume{0950392a-1778-4900-bdaa-be3a22a5ecb0}" SourcePath="G:\"
         VolumeName="vex2k3" />
        <SnapInfo FilerName="avocado" FilerPath="/vol/vex2k3/disk1" SnapSourceDevice="\\.\PhysicalDrive1"
         UniqueIdentifier="exchsnap___vex2k3_0209-2010_12.51.20" />
      </snap>
    </snaps>
  </jobs>
  <jobs appTypeId="53" clientName="vex2k3" commCellName="VEX2K3_NetApp_CommCell" nativeJobId="1266013605"
   subclientName="default" >
    <snaps totalSnap="2" >
      <snap CreationTime="1266013605" name="eloginfo_vex2k3_02-09-2010-17.26.45" >
        <VolumeInfo SourceGUID="\\?\Volume{43405dca-e36d-4114-a5ef-4097cbc1b44}" SourcePath="H:\"
         VolumeName="vex2k3" />
        <SnapInfo FilerName="avocado" FilerPath="/vol/vex2k3/disk2" SnapSourceDevice="\\.\PhysicalDrive2"
         UniqueIdentifier="eloginfo__vex2k3_02-12-2010_17.26.45" />
      </snap>
      <snap CreationTime="1266013605" name="exchsnap__vex2k3_02-12-2010_17.26.45" >
        <VolumeInfo SourceGUID="\\?\Volume{0950392a-1778-4900-bdaa-be3a22a5ecb0}" SourcePath="G:\"
         VolumeName="vex2k3" />
        <SnapInfo FilerName="avocado" FilerPath="/vol/vex2k3/disk1" SnapSourceDevice="\\.\PhysicalDrive1"
         UniqueIdentifier="exchsnap___vex2k3_02-12-2010_17.26.45" />
      </snap>
    </snaps>
  </jobs>
</FDC_SnapList>
```

```xml
<jobs appTypeId="53" clientName="vex2k3" commCellName="VEX2K3_NetApp_CommCell" nativeJobId="1267136274" subclientName="default" >
  <snaps totalSnap="2" >
    <snap CreationTime="1267136274" name="eloginfo_vex2k3_02-25-2010-17.17.54" >
      <VolumeInfo SourceGUID="\\?\Volume{43405dca-e36d-4114-a5ef-4097cbc1b44}" SourcePath="H:\" VolumeName="vex2k3" />
      <SnapInfo FilerName="avocado" FilerPath="/vol/vex2k3/disk2" SnapSourceDevice="\\.\PhysicalDrive2" UniqueIdentifier="eloginfo__vex2k3_02-25-2010_17.17.54" />
    </snap>
    <snap CreationTime="1267136274" name="exchsnap__vex2k3_02-25-2010_17.17.54" >
      <VolumeInfo SourceGUID="\\?\Volume{0950392a-1778-4900-bdaa-be3a22a5ecb0}" SourcePath="G:\" VolumeName="vex2k3" />
      <SnapInfo FilerName="avocado" FilerPath="/vol/vex2k3/disk1" SnapSourceDevice="\\.\PhysicalDrive1" UniqueIdentifier="exchsnap__vex2k3_02-25-2010_17.17.54" />
    </snap>
  </snaps>
</jobs>
<jobs appTypeId="53" clientName="vex2k3" commCellName="VEX2K3_NetApp_CommCell" nativeJobId="1267137590" subclientName="default" >
  <snaps totalSnap="2" >
    <snap CreationTime="1267137590" name="eloginfo_vex2k3_02-25-2010-17.39.50" >
      <VolumeInfo SourceGUID="\\?\Volume{43405dca-e36d-4114-a5ef-4097cbc1b44}" SourcePath="H:\" VolumeName="vex2k3" />
      <SnapInfo FilerName="avocado" FilerPath="/vol/vex2k3/disk2" SnapSourceDevice="\\.\PhysicalDrive2" UniqueIdentifier="eloginfo__vex2k3_02-25-2010_17.39.50" />
    </snap>
    <snap CreationTime="1267137590" name="exchsnap__vex2k3_02-25-2010_17.39.50" >
      <VolumeInfo SourceGUID="\\?\Volume{0950392a-1778-4900-bdaa-be3a22a5ecb0}" SourcePath="G:\" VolumeName="vex2k3" />
      <SnapInfo FilerName="avocado" FilerPath="/vol/vex2k3/disk1" SnapSourceDevice="\\.\PhysicalDrive1" UniqueIdentifier="exchsnap__vex2k3_02-25-2010_17.39.50" />
    </snap>
  </snaps>
</jobs>
```

FIG. 2C-2

```
- <jobs appTypeId="53" clientName="vex2k3" commCellName="VEX2K3_NetApp_CommCell" nativeJobId="1267201085"
    subclientName="default" >
  - <snaps totalSnap="2" >
    - <snap CreationTime="1267201085" name="eloginfo_vex2k3_02-26-2010-11.18.05" >
        <VolumeInfo SourceGUID="\\?\Volume{43405dca-e36d-4114-a5ef-4097cbc1b44}" SourcePath="H:\"
          VolumeName="vex2k3" />
        <SnapInfo FilerName="avocado" FilerPath="/vol/vex2k3/disk2" SnapSourceDevice="\\.\PhysicalDrive2"
          UniqueIdentifier="eloginfo__vex2k3_02-26-2010_11.18.05" />
      </snap>
    - <snap CreationTime="1267201085" name="exchsnap__vex2k3_02-26-2010_11.18.05" >
        <VolumeInfo SourceGUID="\\?\Volume{0950392a-1778-4900-bdaa-be3a22a5ecb0}" SourcePath="G:\"
          VolumeName="vex2k3" />
        <SnapInfo FilerName="avocado" FilerPath="/vol/vex2k3/disk1" SnapSourceDevice="\\.\PhysicalDrive1"
          UniqueIdentifier="exchsnap__vex2k3_02-26-2010_11.18.05" />
      </snap>
    </snaps>
  </jobs>
- <jobs appTypeId="53" clientName="vex2k3" commCellName="VEX2K3_NetApp_CommCell" nativeJobId="1268078992"
    subclientName="default" >
  - <snaps totalSnap="2" >
    - <snap CreationTime="1268078992" name="eloginfo_vex2k3_03-08-2010-15.09.52" >
        <VolumeInfo SourceGUID="\\?\Volume{43405dca-e36d-4114-a5ef-4097cbc1b44}" SourcePath="H:\"
          VolumeName="vex2k3" />
        <SnapInfo FilerName="avocado" FilerPath="/vol/vex2k3/disk2" SnapSourceDevice="\\.\PhysicalDrive2"
          UniqueIdentifier="eloginfo__vex2k3_03-08-2010_15.09.52" />
      </snap>
    - <snap CreationTime="1268078992" name="exchsnap__vex2k3_03-08-2010_15.09.52" >
        <VolumeInfo SourceGUID="\\?\Volume{0950392a-1778-4900-bdaa-be3a22a5ecb0}" SourcePath="G:\"
          VolumeName="vex2k3" />
        <SnapInfo FilerName="avocado" FilerPath="/vol/vex2k3/disk1" SnapSourceDevice="\\.\PhysicalDrive1"
          UniqueIdentifier="exchsnap__vex2k3_03-08-2010_15.09.52" />
      </snap>
    </snaps>
  </jobs>
```

FIG. 2C-3

```xml
- <jobs appTypeId="53" clientName="vex2k3" commCellName="VEX2K3_NetApp_CommCell" nativeJobId="1268082983" subclientName="default" >
  - <snaps totalSnap="2" >
    - <snap CreationTime="1268082983" name="eloginfo_vex2k3_03-08-2010-16.16.23" >
        <VolumeInfo SourceGUID="\\?\Volume{43405dca-e36d-4114-a5ef-4097cbc1b44}" SourcePath="H:\" VolumeName="vex2k3" />
        <SnapInfo FilerName="avocado" FilerPath="/vol/vex2k3/disk2" SnapSourceDevice="\\.\PhysicalDrive2" UniqueIdentifier="eloginfo__vex2k3_03-08-2010_16.16.23" />
      </snap>
    - <snap CreationTime="1268082983" name="exchsnap__vex2k3_03-08-2010_16.16.23" >
        <VolumeInfo SourceGUID="\\?\Volume{0950392a-1778-4900-bdaa-be3a22a5ecb0}" SourcePath="G:\" VolumeName="vex2k3" />
        <SnapInfo FilerName="avocado" FilerPath="/vol/vex2k3/disk1" SnapSourceDevice="\\.\PhysicalDrive1" UniqueIdentifier="exchsnap__vex2k3_03-08-2010_16.16.23" />
      </snap>
    </snaps>
  </jobs>
- <jobs appTypeId="53" clientName="vex2k3" commCellName="VEX2K3_NetApp_CommCell" nativeJobId="1268083439" subclientName="default" >
  - <snaps totalSnap="2" >
    - <snap CreationTime="1268083439" name="eloginfo_vex2k3_03-08-2010-16.23.59" >
        <VolumeInfo SourceGUID="\\?\Volume{43405dca-e36d-4114-a5ef-4097cbc1b44}" SourcePath="H:\" VolumeName="vex2k3" />
        <SnapInfo FilerName="avocado" FilerPath="/vol/vex2k3/disk2" SnapSourceDevice="\\.\PhysicalDrive2" UniqueIdentifier="eloginfo__vex2k3_03-08-2010_16.23.59" />
      </snap>
    - <snap CreationTime="1268083439" name="exchsnap__vex2k3_03-08-2010_16.23.59" >
        <VolumeInfo SourceGUID="\\?\Volume{0950392a-1778-4900-bdaa-be3a22a5ecb0}" SourcePath="G:\" VolumeName="vex2k3" />
        <SnapInfo FilerName="avocado" FilerPath="/vol/vex2k3/disk1" SnapSourceDevice="\\.\PhysicalDrive1" UniqueIdentifier="exchsnap__vex2k3_03-08-2010_16.23.59" />
      </snap>
    </snaps>
  </jobs>
```

FIG. 2C-4

```xml
<?xml version="1.0" encoding="UTF-8" standalone="no" ?>
<FDC_StoragePolicyList foreignProductVersion="NetApp SnapManager" foreignServerName="VEX2K3_NetApp_CommCell" vendorType="2" >
  <spList defaultCopyName="Primary" defaultSnapCopyName="Snap" description="EDC NetApp SnapManager generated Storage Policy" flags="0" policyname="CCM_VEX2K3NetApp_CommCell" type="5">
    <spCopyList archGroupName="CCM_VEX2K3_NetApp_CommCell" copy="1" delayedDays="0" name="Primary" retentionDays="-1" description="Primary Copy for NetApp SnapManager" encType="0" isActive="1" isSnapCopy="0" flags="0" type="1" />
    <spCopyList archGroupName="CCM_VEX2K3_NetApp_CommCell" copy="1" delayedDays="0" name="Snap" retentionDays="-1" description="Snap Copy for NetApp SnapManager" encType="0" isActive="1" isSnapCopy="1" flags="0" type="1" />
  </spList>
</FDC_StoragePolicyList>
```

*FIG. 2D*

SYSTEMS AND METHODS FOR NORMALIZING DATA OF HETEROGENEOUS DATA SOURCES

REFERENCE TO RELATED APPLICATIONS

This application claims the benefit of priority under 35 U.S.C. §119(e) of U.S. Provisional Application No. 61/165,095, filed on Mar. 31, 2009, and entitled "Information Management Systems and Methods for Heterogeneous Data Sources," the entirety of which is hereby incorporated herein by reference to be considered part of this specification.

This application is also related to the following U.S. patent applications filed on even date herewith, each of which is hereby incorporated herein by reference in its entirety:
- U.S. patent application Ser. No. 12/749,862, entitled "Information Management Systems and Methods for Heterogeneous Data"; and
- U.S. patent application Ser. No. 12/750,009, entitled "Data Mining Systems and Methods for Heterogeneous Data Sources".

BACKGROUND

1. Field

Embodiments of the invention relate to information management and, in particular, to systems and methods for managing data from heterogeneous data sources.

2. Description of the Related Art

As the reliance on electronic information increases, individuals and businesses are turning more and more to various backup data solutions. Conventional backup systems generally employ a monolithic backup and retrieval system servicing a single server with attached storage devices. These systems usually control all aspects of a data backup or retrieval and often direct only one type of backup, whether it is a network backup or a single machine backup.

With the numerous available backup solutions also comes the challenge associated with accessing and utilizing the stored data, especially when data is stored in different backup formats in a distributed computing environment. For instance, in a business enterprise, different divisions within the same company may use different vendors and/or applications to back up, or otherwise store, data over a network having multiple interconnected computers, often heterogeneous and/or geographically remote.

Certain information management systems attempt to address at least some of the foregoing problems by using a common application to back up data from a variety of sources (e.g., SQL server, MICROSOFT EXCHANGE) such that the all the data in the enterprise environment is stored in the same backup format. For example, the GALAXY system commercially available through CommVault Systems, Inc. (Oceanport, N.J.) supports backup of data through a common application that allows for subsequent data retrieval, reporting and information processing. However, such systems still require data from the various sources to be converted from a native format to a different single backup format.

SUMMARY

In view of the foregoing, a need exists for information management systems and methods that ingest data in a variety of formats, including different backup formats, for access and/or management through a single view. For example, in certain embodiments of the invention, a system is disclosed that obtains data from heterogeneous backup sources and that allows a user (e.g., a system administrator) to access, catalog and/or manipulate the data through a single interface while, at the same time, allowing the backup sources to retain the data in their native backup formats.

Certain systems and methods are disclosed herein for integrating a plurality of disparate backup devices with a unified graphical user interface. In certain embodiments, a management console manages data from various backup devices, while retaining such data in its native backup format. For example, the management console can comprise a window that displays a hierarchical view of manageable client devices on a network and/or data associated therewith. Moreover, the console can further provide options through which the console user may navigate to process the data of one or more different devices. For instance, the user may be able to "drill down" through the hierarchy of client devices. In certain embodiments, the user interface can display various types of reporting information, such as graphs, alerts, charts, diagrams, textual reports or the like, based on one or more rules or policies applied to the data of the client devices.

For example, certain embodiments of the invention provide a unified single platform and interface that reduces the need for multiple data management products and/or customized data utilities for each individual client device and that provides a single pane of glass view into data management operations. Such embodiments can advantageously integrate various types of storage formats and media, thereby allowing a user to retain existing storage infrastructures and further facilitating scaling to meet long-term management needs.

In certain embodiments, system and methods disclosed herein can create a unified policy management framework for multiple pre-certified storage vendors or storage formats and offer access to data on various storage tiers (e.g., online, nearline, offline). Certain embodiments further include offline mining tools for non-backup data, such as EXCHANGE, SHAREPOINT or ACTIVE DIRECTORY data, to recover granular messages and documents directly from database recovery copies.

In certain embodiments, a method is disclosed for administering a storage network comprising heterogeneous client devices. The method includes displaying with a management console information regarding backup data stored in a plurality of heterogeneous client devices, wherein the backup data of each client device is stored in a different backup format, and wherein the management console integrates a plurality of utilities for performing a plurality of data management operations on the backup data of the heterogeneous client devices, wherein the management console further provides a single interface for the plurality of utilities. In further embodiments, the method also includes selecting a first data management operation of the plurality of data management operations to be performed by at least one of the plurality of utilities in response to user input and selecting backup data from at least one of the plurality of heterogeneous client devices in response to user input. Finally, the method can include performing the first data management operation on the selected backup data of the at least one client device in response to said selecting the first data management operation and said selecting the backup data.

In certain embodiments, a system is disclosed for administering a storage network comprising heterogeneous client devices. The system includes a plurality of data connectors and a management console. The data connectors are in communication with a plurality of heterogeneous client devices, each of the plurality of data connectors being configured to obtain data from a respective one of the plurality of heterogeneous client devices. The management console executes on a computing device in network communication with the plurality of data connectors. The management console is further configured to: provide a plurality of utilities for performing data management operations on the data obtained by the data connectors; display via a unified interface on-screen graphics indicative of each of the heterogeneous client devices and the utilities; receive a selection of a first data management operation to be performed by at least one of the utilities on the data of at least one of the heterogeneous client devices; and perform the first data management operation on the selected data of the at least one heterogeneous client device.

In certain further embodiments, a system is disclosed for administering a storage network comprising heterogeneous client devices. The system includes means for obtaining data from a plurality of heterogeneous client devices storing data in a plurality of different data formats and means for providing a plurality of utilities for performing a plurality of data management operations on the data obtained by said obtaining means. The system further includes means for displaying via a unified interface on-screen graphics indicative of each of the heterogeneous client devices and the utilities and means for receiving a selection of a first data management operation to be performed by at least one of the utilities on the data of at least one of the heterogeneous client devices. The system further includes means for performing the first data management operation on the selected data of the at least one heterogeneous client device.

In addition, a method is disclosed for managing data in a computer system. The method includes: obtaining first data in a first file format from first media, the first data being associated with a first payload and first metadata; processing the first payload to generate second metadata different than the first metadata; and storing in a data structure the second metadata and at least a portion of the first metadata in a first entry associated with the first media. The method further includes: obtaining second data in a second file format from second media, the second data being associated with a second payload and third metadata, the second file format being different than the first file format; processing the second payload to generate fourth metadata different than the third metadata; and storing in the data structure the fourth metadata and at least a portion of the third metadata in a second entry associated with the second media. The method can further include presenting the first and second entries in a unified view of a user interface, such as in a single browser window.

In certain embodiments, a system is disclosed for managing data from a plurality of heterogeneous client devices. The system comprises first and second data connectors, a management module and a data structure. The first data connector obtains first data in a first file format from a first client device, the first data having a first payload and first metadata associated with the first payload. The second data connector obtains second data in a second file format from a second client device, the second data having a second payload and second metadata associated with the second payload, the second file format being different than the first file format. The management module executes on a computing device in communication with the first and second data connectors to receive the first and second payloads and first and second metadata. The management module can further process the first payload to generate third metadata different than the first metadata and to process the second payload to generate fourth metadata different than said second metadata. A data structure, such as an Extensible Markup Language (XML) file, is configured to store the third metadata and at least a portion of the first metadata in a first entry associated with the first client device and to store the fourth metadata and at least a portion of the second metadata in a second entry associated with the second client device.

In certain embodiments, a system is disclosed for managing data from a plurality of heterogeneous client devices. The system includes first means for obtaining first data in a first file format from a first client device, the first data having a first payload and first metadata associated with the first payload. The system also includes second means for obtaining second data in a second file format from a second client device, the second data having a second payload and second metadata associated with the second payload, the second file format being different than the first file format. The system further includes means for receiving the first and second payloads and first and second metadata and for processing the first payload to generate third metadata different than the first metadata and to process the second payload to generate fourth metadata different than the second metadata. In addition, the system can include means for storing the third metadata and at least a portion of the first metadata in a first entry associated with the first client device and to store the fourth metadata and at least a portion of the second metadata in a second entry associated with the second client device.

In certain embodiments, a method is disclosed for processing data from a plurality of heterogeneous client devices. The method comprises providing a single interface including on-screen graphics representing a plurality of heterogeneous client devices in a storage network system, wherein the heterogeneous client devices comprise first client devices storing backup data in different backup formats and second client devices storing non-backup data. The method further includes receiving a data operation request including (i) a selection of at least one second client device, and (ii) a first data management operation to be performed on the non-backup data of the at least one second client device. The method also includes copying the non-backup data of the at least one second client device to a first memory location; emulating on a proxy device a native application associated with the non-backup data of the at least one second client device; and processing with the emulated native application the first data management operation on the copied non-backup data and storing the processed, copied non-backup data on a storage device.

In certain further embodiments, a system is disclosed for administering a storage network comprising heterogeneous client devices. The system can include first and second client devices, a proxy device, a secondary storage device and a management console. The first client devices are configured to store backup data in different file formats, and the second client devices are configured to store non-backup data in different file formats. The proxy device includes at least one emulated native application executing thereon, and the management console is configured provide a single interface including on-screen graphics representing the first and second client devices. The management console can be further configured to receive a first data operation request with respect to the non-backup data stored on at least one of the second client devices and to copy the non-backup data of the at least one second client device to a staging location associated with the proxy device. The proxy device can be further configured to process the non-backup data of the at least one second client device with the at least one emulated native application and to copy the processed non-backup data to the secondary storage device.

In certain embodiments, a system is disclosed for administering a storage network comprising heterogeneous client devices. The system includes first means for storing backup data in a plurality of first file formats and second means for storing non-backup data in a plurality of different second file formats. The system also includes means for providing a single interface including on-screen graphics representing said first and second storing means and for receiving a first data operation request with respect to the non-backup data stored on said second storing means. The system further includes means for processing a copy of the non-backup data with at least one emulated native application and third means for storing the processed copy of the non-backup data.

In certain embodiments, a method is disclosed for managing data in a computer system. The method comprises obtaining first data in a first file format from first media, the first data being associated with a first payload and first metadata. The method further comprises processing the first payload to generate second metadata different than the first metadata and storing in a database the second metadata and at least a portion of the first metadata in a first entry associated with the first media. The method further comprises obtaining second data in a second file format from second media, the second data being associated with a second payload and third metadata, the second file format being different than the first file format. The method also comprises processing the second payload to generate fourth metadata different than the third metadata and storing in the database the fourth metadata and at least a portion of the third metadata in a second entry associated with the second media. Finally, the method can further present the first and second entries in a unified view (e.g., single browser window) of a user interface.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIGS. 2A through 2D illustrate exemplary embodiments of simplified data structures usable for storing data and/or metadata extracted from one or more client devices of the information management system of FIG. 1.

DETAILED DESCRIPTION OF PREFERRED EMBODIMENTS

Embodiments of the invention disclosed herein are advantageously used to manage data from heterogeneous sources and formats in a computer network environment. In certain embodiments, an information management console or appliance communicates with multiple client devices, such as different backup servers and/or databases, to present heterogeneous data to a user in a manageable format through a unified view. Thus, data in the information management system can be stored in different backup formats (e.g., by different backup applications) and/or non-backup formats, while also being capable of being displayed to the user in a single view for further data processing and/or manipulation (e.g., restoring, archiving, searching or the like). As a result, data in stored on the client devices is not required to be converted to a different format through a common backup or archive application prior to being managed by the information management console.

In certain embodiments of the invention, the information management console can utilize individual agents or data connectors that are familiar with the data characteristics and formats of different file types to obtain file data, metadata and/or configuration settings from the client devices. Moreover, the user is able to manage all data types in the information management system through a single interface. In certain embodiments, metadata associated with the data on the heterogeneous client devices is normalized for presentation to the user such as through one or more reports.

In certain embodiments, the versatility of the disclosed information management systems and methods allows for flexibility in managing data in an enterprise environment. For instance, disclosed systems and methods allow for the dynamic addition or removal of client devices from the system, application of particular retention policies or other storage polices across select data from a plurality of heterogeneous data sources, access to data of one or more databases without requiring the native database application to be online, restoration of data whose backup application has been decommissioned, combinations of the same or the like.

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the invention and not to limit the scope of the disclosure.

In addition, methods and functions described herein are not limited to any particular sequence, and the blocks or states relating thereto can be performed in other sequences that are appropriate. For example, described blocks or states may be performed in an order other than that specifically disclosed, or multiple blocks or states may be combined in a single block or state.

Figure 1:
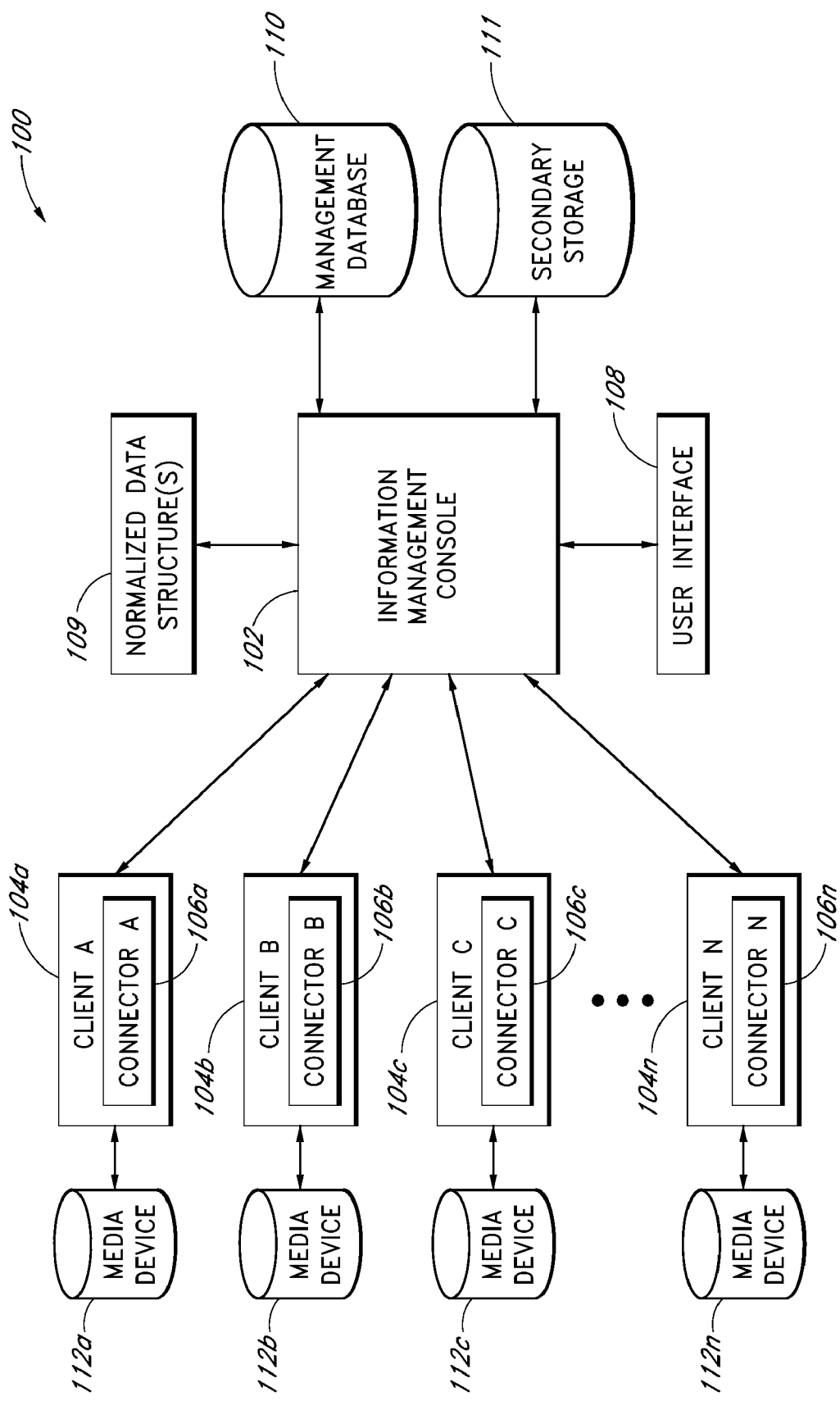
FIG. 1 illustrates an exemplary block diagram of an information management system, according to certain embodiments of the invention.

FIG. 1 illustrates a block diagram of an information management system 100, according to certain embodiments of the invention. In certain embodiments, the information management system 100 provides a common interface for the management of data stored on heterogeneous data sources and in a variety of file formats, such as data in different backup and/or non-backup formats. For example, as described in further detail below, certain embodiments of the information management system 100 normalize disparate backup data and accompanying metadata from a variety of data sources. This normalized data is then advantageously combined with additional metadata to be displayed and/or managed via a common, unified graphical user interface (GUI).

With reference to FIG. 1, the information management system 100 includes an information management appliance or console 102 that communicates with a plurality of data sources or client devices 104a, 104b, 104c, . . . 104n (hereinafter "104"). In certain embodiments, the information management console 102 comprises one or more data agnostic server computers that can receive ingested data and/or perform various data management functions or utilities disclosed herein. For instance, the information management console 102 can comprise a plurality of modules executing on the one or more server computers to ingest heterogeneous data from a variety of backup and/or database sources and present the data to the user via a common format. In yet other embodiments, the information management console 102 can comprise one or more workstations, personal computers, laptops, notebooks, processors, computing devices, virtual machines, combinations of the same or the like.

The information management console 102 communicates with each of the plurality of client devices 104 to obtain the data to be managed. In certain embodiments, the client devices 104 form part of a business enterprise system and/or comprise heterogeneous sources of data. For instance, the client devices 104 can comprise servers from different backup vendors (e.g., COMMVAULT, VERITAS, NETAPP, EMC, COMPUTER ASSOCIATES) that each back up data in a different format to one or more media devices 112a, 112b, 112c, . . . 112n (hereinafter "112") (e.g., secondary storage devices). In such embodiments, the information management console 102 can communicate directly with the client device(s) 104, directly with the media device(s) 112, and/or with the media device(s) 112 through the client device(s) 104, a proxy server and/or other network path.

In certain embodiments, one or more of the client devices 104 can comprise a database server or other collection of non-backup information accessible by the information management console 102. For instance, the databases can be associated with a variety of database applications, such as, for example, EXCHANGE SERVER, SHAREPOINT SERVER, SQL SERVER, LOTUS NOTES, ORACLE applications, SAP applications or the like. In certain embodiments, the information management console 102 can access the databases via a database management system (DBMS).

It will be appreciated that the client devices 104 can comprise data stored on a variety of physical media and/or virtual devices, such as magnetic disk, tape, cloud storage, filers, combinations of the same or the like. In certain embodiments, the client devices 104 can comprise virtual machines executing on one or more host servers.

Although media devices 112 are illustrated separate from the client devices 104 in FIG. 1, it should be appreciated that the media device 112 can also be integrated with client device 104, and/or multiple client devices 102 can share a common media device 112. Thus, the term "client device" as used herein is a broad term and is used in its ordinary sense and includes, without limitation, any source of data, database or data repository, or a computing device (e.g., as a stand-alone complete entity and/or distributed over multiple entities) that can access such data.

For example, in embodiments in which the client device 104 comprises a backup server or the like, it is appreciated that the client device 104 can coordinate data retrieval from a plurality of storage or media devices to be transferred to and/or managed by the information management console 102 through the client device 104. Thus, the information management console 102 need not read directly from, or communicate with, all storage devices 112 that contain data managed by the information management console 102. Moreover, a single client device can comprise a server or other computing device that communicates with a plurality of additional client devices (e.g., sub-clients) coupled thereto.

Each of the client devices 104 is further associated with at least one of the agent or data connectors 106a, 106b, 106c, . . . 106n (hereinafter "106") for gathering and providing relevant information from the client device 104 to the information management console 102. In certain embodiments, each data connector 106 is configured to perform a discovery of the data on the client device 104, such as data produced by one or more backup applications (e.g., SIMPANA (CommVault Systems, Inc.), NETBACKUP (Symantec Corporation), NETWORKER (EMC Corporation)). In general, during this discovery process, the data connector 106 retrieves data and/or metadata from the client device 104 and molds the retrieved information into a predetermined and/or normalized data format (e.g., the GALAXY data format provided by CommVault Systems, Inc.).

In certain embodiments, each connector 106 is specific to a particular type of data format and/or client device 104. For instance, each client device 104 can have a plurality of application-specific connectors 106 associated therewith for handling different data types stored on the device 104. For example, one connector 106 can be configured to handle backup data, while another connector 106 is configured to track system configurations of the client device 104.

In certain embodiments, when the client device 104 is initially installed in, or connected to, the information management system 100, a user can be prompted, such as through a user interface 108, for information (e.g., configuration information) regarding the data format(s) used by the client device 104. For example, when a client device 104 comprising an EXCHANGE SERVER is initially installed in the information management system 100, the user can input information regarding user mailboxes, snapshot information, security and/or authentication information, combinations of the same or the like. Following the entry of the configuration information, the appropriate data connector 106 can be push-installed on the client device 104 from the information management console 102. In yet other embodiments, the data connector 106 can be located external to the client device 104, installed on one or more media devices 112 of the client device 104, and/or communicate remotely with the client device 104 via remote procedure calls (RPCs), an application programming interface (API), a component object model (COM) interface, combinations of the same or the like.

In yet other embodiments, the data connector 104 can be configured to scrape transaction logs, execute database commands, issue queries, monitor filter drivers and/or registry information, read backup files, or the like, to obtain pertinent information from the client device 104. In yet other embodiments, the data connector 104 can function as one of the clients, read third-party metadata, read XML files, parse INI or other configuration files, combinations of the same or the like, to obtain information about data on the client device 104.

In certain embodiments, the connectors 106 provide file data to the information management console 102. For example, the connectors 106 can provide copies of select data from the client devices 104 based on one or more requests from the information management console 102. In certain embodiments, the connectors 106 are configured to provide metadata to the information management console 102 in addition to, or in place of, actual file data. For example, the connectors 106 can provide information regarding: identification of media (e.g., tapes, magnetic disks) containing the file data, identification of client devices or machines 102 associated with the data, creation date, modification date, file type, file size, owner, permissions, native data retention polices, storage locations, jobs, schedules, existing and/or scheduled snapshots, protection of databases, mailbox information, combinations of the same or the like. In yet further embodiments, the connectors 106 can provide statistics regarding use of a particular client device 104 or groups of devices, such as, for example, daily data growth on machine, number of users, new mailboxes setup or the like.

In certain preferred embodiments, the data connectors 106 obtain the raw data and/or metadata in the native format of the application(s) used by the particular client device 104 and can push the information to the information management console 102. This advantageously allows for users to retain backup data from a plurality of vendors without requiring all the data to be copied or transformed into a different format. The obtained information is advantageously input into a normalized data model or structure 109 that includes multiple fields that are common to a variety of data formats. In certain embodiments, the data structure 109 advantageously provides a common schema or platform with which to manage and/or manipulate data from a variety of different data formats and/or heterogeneous or homogeneous client devices 104.

For instance, in certain embodiments, the normalized data structure 109 can comprise an XML file that receives ingested data from a plurality of data connectors 106. Simplified examples of such XML files are shown and described with reference to FIGS. 2A-2D. In yet other embodiments, each client device 102 and/or data format is associated with a single data structure 109.

As further illustrated in FIG. 1, the normalized data structure 109 is maintained by the information management console 102. In certain embodiments, the data structure 109 can be stored on the information management console 102, a management database 110 and/or a secondary database 111. In yet other embodiments, the data structure 109 can be maintained and/or stored by the individual data connectors 106, on a central storage device, or the like. In certain embodiments, the data structure 109 can comprise an index, a table, combinations of the same or the like.

In certain embodiments, the connectors 106 are capable of querying one or more client devices 104 and/or media devices 112 for higher-level metadata without needing to enter or touch the actual media. For example, the connectors 106 can interface with one or more APIs associated with the particular software platform executing on the client device 104. In yet other embodiments, the connectors 106 read directly from the media of the client device 104 to obtain the necessary data and/or metadata.

In certain embodiments, the connectors 106 are configured to persistently and/or periodically monitor the client devices 104. Such monitoring can include, for example, tracking information relating to one or more jobs and/or media associated with a particular client 104. In yet other embodiments, the connectors 106 can be configured to execute on demand, such as in response to instructions from a user, specified policy or rule.

In certain embodiments, the client devices 104 advantageously retain the data stored thereon in the native backup format(s). That is, the data connector 106 or information management console 102 does not substantially modify or entirely copy the data stored on the client device 104. In yet further embodiments, "foreign" or "native" applications running on the client device 104 are monitored by the connector 116 to identify changes to the data. Moreover, in such embodiments, if backup data from the client device 104 is to be restored for further processing, the foreign application can be used to restore the data, such as to a temporary staging area.

The user interface 108 advantageously provides a unified view of the data within the information management system 100 so as to allow a user (e.g., a system administrator) to manage and/or view data from multiple clients 104. For example, the user interface 108 can provide the user with a single view and access to the data of heterogeneous source devices, such as devices with backup data from different backup vendors.

The user interface 108 can also allow the user to manage data that has been cataloged on a plurality of different source devices 104, even if the data is stored in different backup or other file formats. In certain embodiments, the user interface is populated with data acquired from, or based on information stored in, the normalized data structure 109. For instance, in certain embodiments, the user interface 108 can provide the user with the option of creating copies of select portions of data from different source devices 104 that have been cataloged or scanned by the data connector 106.

The ability to process and retrieve select pieces of data from multiple client devices 104, each with data in its own native format, provides significant advantages to the information management system 100. For example, a storage administrator wanting to back up files, documents and/or email that contain a particular set of words (or other criteria), can submit his or her data request via the user interface 108.

In certain embodiments, the user can select which of the different client devices 104 are to be associated with the data request. The information management console 102 can then instruct the different connectors 106 associated with the select client devices 104 to obtain the requested data. Because each connector 106 is familiar with the file format of the data on the corresponding client device 104, the connectors 106 are able to obtain the requested data and transmit the data from the different backup sources or file formats to the information management console 102 to be backed up. In yet other embodiments, the connectors 106 can send copies of the entire data from the selected client device 104 to the information management console 102 for further processing and selective backing up of data portions.

In certain embodiments, the information management console 102 stores in a management database 110 information regarding the client devices 104, jobs and/or media associated with one or more backup files and/or databases. For instance, the database 110 can maintain a map (e.g., a table or other data structure) of client devices 104 to particular jobs running in the information management system 100 based on information gathered by the connectors 106.

In certain embodiments, the database 110 maintains a mapping of a plurality of heterogeneous backup environments (e.g., client devices 104 from different vendors). This mapping, in certain instances, can be displayed through the user interface 108 to provide a user with a single view of the backup jobs being performed and/or scheduled within the information management system 100. In such embodiments, a user can advantageously determine if the backups from different vendors all comply with applicable storage polices and/or guidelines.

In yet other embodiments, the database 110 can store select portions of file data obtained by the connectors 106. For example, as discussed above, a user may be given the option through the user interface 108 to specify which types of data should be part of a backup and/or migration operation for long term storage (e.g., to satisfy certain legal hold requirements, storage policies, user preferences or the like). These data portions can be obtained by the information management console 102 through the connectors 106 to be stored in the database 110. In yet other embodiments, the management database 110 can be configured to store pointers or other links to the pertinent file data that is stored on and/or maintained by one or more of the client devices 104. Such embodiments are discussed in more detail below with respect to FIG. 7.

In further embodiments, the database 110 can store a plurality of rules and/or policies for managing the data of the various client devices 104. For instance, the database 110 can store information regarding the frequency of scanning the client devices 104 with the connectors 106. Other rules or policies can provide established plans or conditions regarding data retention, security, life cycle management, or the like.

In certain embodiments, at least a portion of the database 110 comprises a metabase that stores metadata associated with files on the client device(s) 104. Additional details regarding metabases usable with embodiments of the invention are disclosed in U.S. patent application Ser. No. 11/563,940, filed Nov. 28, 2006, now published as U.S. Patent Application Publication No. 2007-0179995 A1, which is hereby incorporated herein by reference in its entirety to be considered part of this specification.

As shown, the information management system 100 further comprises secondary storage 111 in communication with the information management console 102. In certain embodiments, the secondary storage 111 serves as a repository for data processed by the information management console 102.

In yet other embodiments, the secondary storage 111 can serve as a staging area for data to be processed by the information management console 102. For example, select client data needing to be temporarily restored or copied for particular data management or manipulation operations can be moved to the secondary storage 111.

It should also be understood from the disclosure herein that the management database 110 and/or secondary storage 111 can each comprise a plurality of databases and/or data storage structures in one or more locations, or can be combined into a single storage device or database. For example, a portion of the database 110 can be configured to store actual file data (e.g., archive data), while another portion of the database 110 can be configured to store metadata and/or configuration settings.

One or more of the components of the information management system 100 can advantageously communicate with each other through a network or other means for communicating. In certain embodiments, the network comprises a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

As discussed above, the information management system 100 is configured to enrich the information extracted from the data on the heterogeneous client device(s) 104. For instance, the information management console 102 and/or data connector(s) 106 can supplement the normalized data structure 109 with customized metadata related to the extracted information and/or client device 104. In certain embodiments, the value-added information can be common to various types of data formats.

FIGS. 2A-2D illustrate exemplary embodiments of simplified data structures usable in the information management system 100 for storing data and/or metadata extracted from heterogeneous client devices 104. For example, the illustrated data structures can correspond to the normalized data structure(s) portrayed and described with respect to FIG. 1. In certain embodiments, the data structures advantageously provide means for processing data of the heterogeneous client devices 104 to be displayed on a common interface, manipulating such data with single queries that span the multiple client devices 104 and the like.

In particular, FIG. 2A illustrates an exemplary XML data structure 209a for capturing information regarding data on one or more client devices 104. In certain embodiments, the data structure 209a is stored in a database accessible by the information management console 102 and comprises multiple fields that provide for the normalization of data from multiple foreign data repositories, such as both backup and non-backup (e.g., database server) data.

As shown in FIG. 2A, the data structure 209a comprises information regarding a client device 104 utilizing the SNAPMANAGER FOR MICROSOFT EXCHANGE storage management program offered by NetApp, Inc. For instance, the data structure 209a includes entries regarding the operating system being used by the client device 104, passwords, directory information, application information and the like.

FIG. 2B illustrates an exemplary XML data structure 209b for capturing information regarding one or more jobs associated with the client device(s) 104. For example, the data structure 209b includes entries regarding the types of storage operations to be performed on the client device data, storage policy information, data locations and the like.

FIG. 2C illustrates an exemplary XML data structure 209c for capturing information regarding one or more snapshots associated with data of the client device(s) 104. In particular, the data structure 209c contains information regarding snapshots taken with a NETAPP software program. For example, the data structure 209c includes entries regarding the snapshot creation time, snapshot location, source data location and the like.

FIG. 2D illustrates an exemplary XML data structure 209d for capturing information regarding one or more storage policies associated with the client device(s) 104. In particular, the data structure 209d includes entries regarding storage policies associated with the NETAPP storage platform, including the client device 104 to which the storage policy applies, descriptions of the data copies, storage retention information, and the like.

Although the data structures 209a-209d have been described with reference to particular embodiments, it should be understood that other types of data structures and/or data fields can be used to store ingested data and/or metadata obtained from the client device(s) 104. For example, the data structure 209 can include fields related to encryption information, compression, information lifecycle management, user permissions and like metadata.

Figure 3:
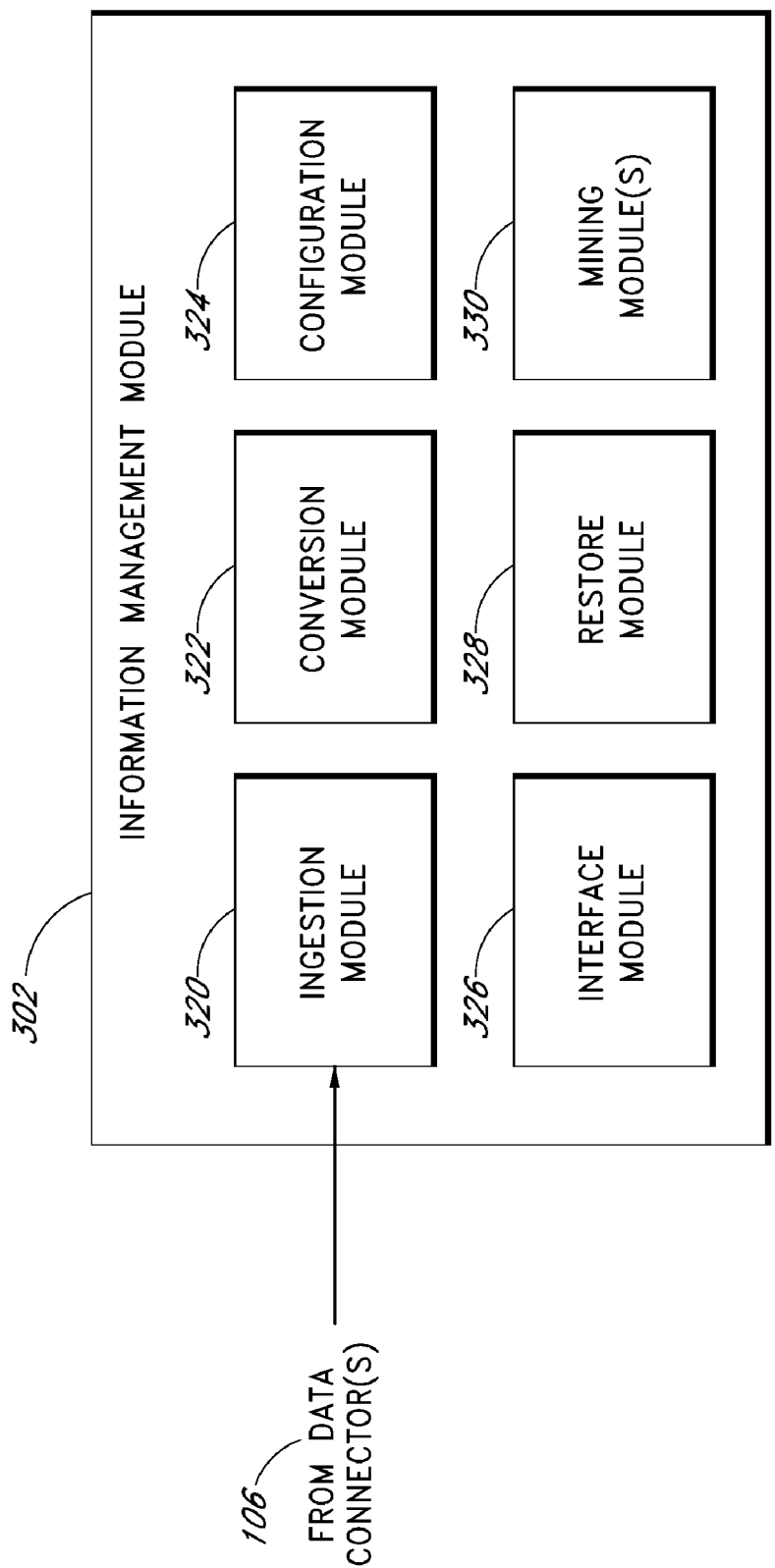
FIG. 3 illustrates a block diagram of an exemplary embodiment of the information management console of the information management system of FIG. 1.

FIG. 3 illustrates an exemplary block diagram of further details of an information management console 302, according to certain embodiments of the invention. In general, the information management console 302 is configured to ingest, catalog and manage data from a plurality of heterogeneous sources, such as backup servers using different backup formats. For instance, in certain embodiments, the information management console 302 can be used in the information management system 100 of FIG. 1 to provide a single pane view of the data of the plurality of client devices 104.

For exemplary purposes, the management console 302 will be described with reference to a plurality of modules executing on one or more physical computing devices that interact with each other to ingest, prepare and manipulate data with respect to the client devices 104. It should be understood that, in other embodiments, multiple modules can be combined into a single module, or one module can be separated into additional modules to perform substantially the same operations. Moreover, in other embodiments, one or more of the below-described modules can be implemented in a data connector 106, on a separate server or the like.

As shown, the information management console 302 comprises an ingestion module 320 that receives the data obtained from client devices 104 by the data connectors 106. As discussed above, in certain embodiments, the ingested data is obtained from heterogeneous data sources and stored in one or more normalized data structures 109 according to a predefined storage policy, user preference and/or format.

In certain further embodiments, the ingestion module 320 is configured to receive and/or obtain metadata regarding the files/folders on the client devices 104. For example, the connectors 106 can obtain various levels of metadata depending on the preferences of the user and/or makeup of the information management system 100. In certain embodiments, the ingestion module 320 first receives higher-level metadata regarding the client system data and can subsequently instruct the data connectors 106 to obtain additional lower-level metadata upon specific requests by the user. Moreover, in certain embodiments, the ingestion module 320 is configured to scrub incoming data files for metadata (e.g., file type, user permissions, security settings), relevant data content, combinations of the same or the like.

A conversion module 322, in certain embodiments, receives and normalizes metadata obtained by the ingestion module 320. For instance, the conversion module 322 can convert and/or associate ingested metadata with a specific data model, such as predetermined data fields of the normalized data structure 109. Moreover, in certain embodiments, the conversion module 322 can further enrich the information stored in the data structure 109 based on the ingested data. For instance, the conversion module 322 can, based on the ingested data of a particular client device 104, generate additional metadata (value-added metadata) that is not produced or maintained by the native applications of the client device 104. The conversion module 322 can then store this additional metadata in the normalized data structure 109 and repeat the process for ingested data of different client devices 104. In this manner, the normalized data structure 109 can include additional metadata that is common for all data types of the client devices 104.

A configuration module 324, in certain embodiments, maintains the configuration settings for each of the plurality of client devices 104. For instance, the configuration settings can inform the information management console 302 of backup schedules, retention policies, or the like associated with backup devices in the information management system 100. The configuration module 316 can also communicate with an interface module 318 to provide a list of user utilities or data operations available with respect to certain types of data. For instance, for a MICROSOFT EXCHANGE client device, the user may be provided with information regarding different storage groups within the EXCHANGE server, users within the EXCHANGE server, or the like, based on settings maintained by the configuration module 324.

In certain embodiments, the configuration module 324 receives settings input by the user through the user interface 108. In yet other embodiments, the configuration module 324 can receive such settings from the data connectors 106, the ingestion module 320, or from data stored in the management database 110.

The interface module 326 transmits data to and receives data from the user interface 108. In certain embodiments, the interface module 326 formats information received from the database 110 for graphical presentation to the user via an external display, such as through a menu, graph, report, window or the like.

The information management console 302 further comprises one or more restore modules 328. In certain embodiments, the restore modules 328 are configured to restore data from one or more identified media devices without the need for the native backup application to be online. In certain embodiments, each restore module 328 is specific to a particular type of data, such as a backup data format.

For instance, in certain embodiments, the user can select through the user interface 108 to restore data of one or more files that are backed up in a format that corresponds to a backup application that has been decommissioned. In such embodiments, the restore module 328, which can recognize the backup format and appropriately process the data, can identify and copy select portions of the backed up data. In certain embodiments, the restore module 328 can access the data directly after the media is mounted by the information management console 302, and/or the restore module 328 can access the backed-up data through a proxy server (e.g., by emulating a native application) or other pathway.

The information management console 302 further comprises one or more mining modules 330 that are configured to mine or process particular types of data. For instance, the mining module(s) 330, in certain embodiments, can break down a database into individual elements on a granular level (e.g., mailboxes, email messages, storage accounts, user accounts, etc.) for additional cataloging, data processing, copying or the like. In certain embodiments, each mining module 330 is specific to a particular type of data (e.g., EXCHANGE data, SHAREPOINT data, or the like).

Although the information management console 302 has been described with reference to particular embodiments, other arrangements and configurations of the information management console 302 can be used. For instance, the information management console 302 can operate with fewer modules than those illustrated in FIG. 3. In yet other embodiments, the information management console 302 can comprise additional modules that perform additional data processing on client device data, information stored in the normalized data structure(s) 109, staged data that has been restored from a client backup file, or the like. Moreover, such data operations can be based on one or more user queries or commands received from the interface module 326, storage polices, rules or the like, and can include, for example: archiving, searching, data conversion, indexing, single instancing, de-duplication, legal discovery, data classification, implementing storage policies, combinations of the same or the like.

As discussed, disclosed embodiments of the invention allow for reporting, diagnostic, maintenance and/or other tools to be applied to the extracted data/metadata from heterogeneous data sources. Such embodiments, thereby, advantageously allow for such tools to be performed with fewer queries, since it is not necessary to have multiple available queries that each apply to only a single data format.

Figure 4A:
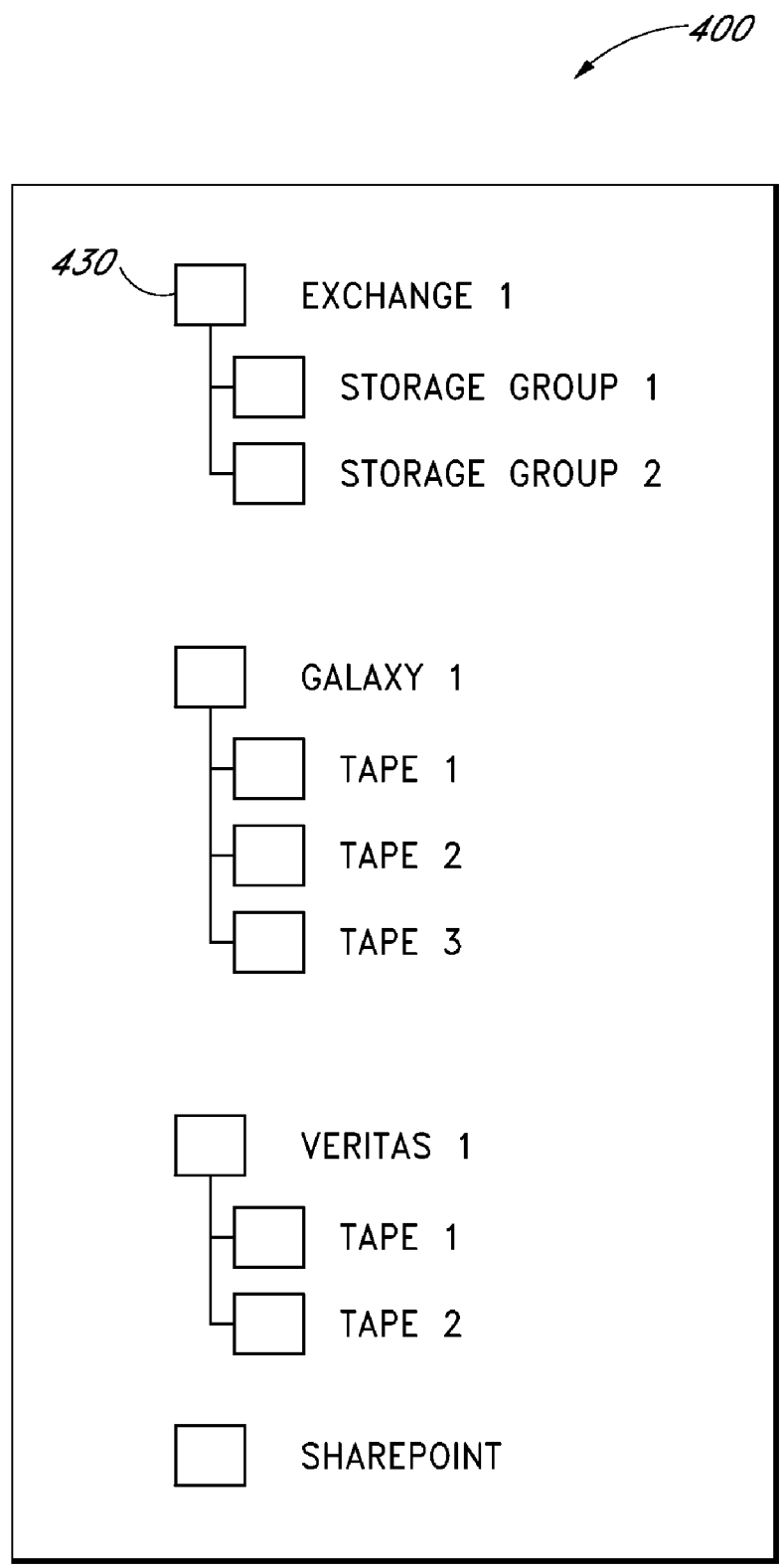
FIG. 4A illustrates an exemplary simplified menu usable with the user interface of the information management system of FIG. 1.

FIG. 4A illustrates an exemplary simplified menu 400 for displaying in a common window a variety of source devices in an information management system. In certain embodiments, the menu 400 is accessible through the user interface 108 of the information management system 100 of FIG. 1. In particular, the menu 400 comprises a "drill down" menu in a tree structure format that identifies various client devices 104 associated with the information management console 102. In certain embodiments, the hierarchical structure of the menu 400 can advantageously reflect the physical or logical configuration of the information management system 100. For instance, in certain embodiments, the user is able to select an icon or node of the tree structure that is associated with a client device to determine if additional sub-clients or other computing devices, such as media devices, are further associated with the higher-level device.

For instance, as illustrated in FIG. 4A, one of the client devices 104 of the information management system 100 is identified in the menu 400 as "GALAXY 1." This client device is further associated with three backup tapes (i.e., "TAPE 1," "TAPE 2" and "TAPE 3"). In certain further embodiments, when the user selects a particular node 430 (such as an end node), the user is provided with a number of options or data utilities that are available for data associated with the node. For instance, the user may be provided (e.g., through a pop-up window, a drop-down list, or the like) with operation menus to assimilate jobs into the information management console 102; archive, search, or index data of the node; combinations of the same or the like.

As can be seen from the menu 400, the user interface can include both backup and non-backup client devices in a single view. Moreover, although the menu 400 provides one example of a graphical interface for a user, other embodiments of the invention can use different types of user interfaces including, but not limited to, windows, models, lists, tables, links, browsers, combinations of the same or the like.

Figure 4B:
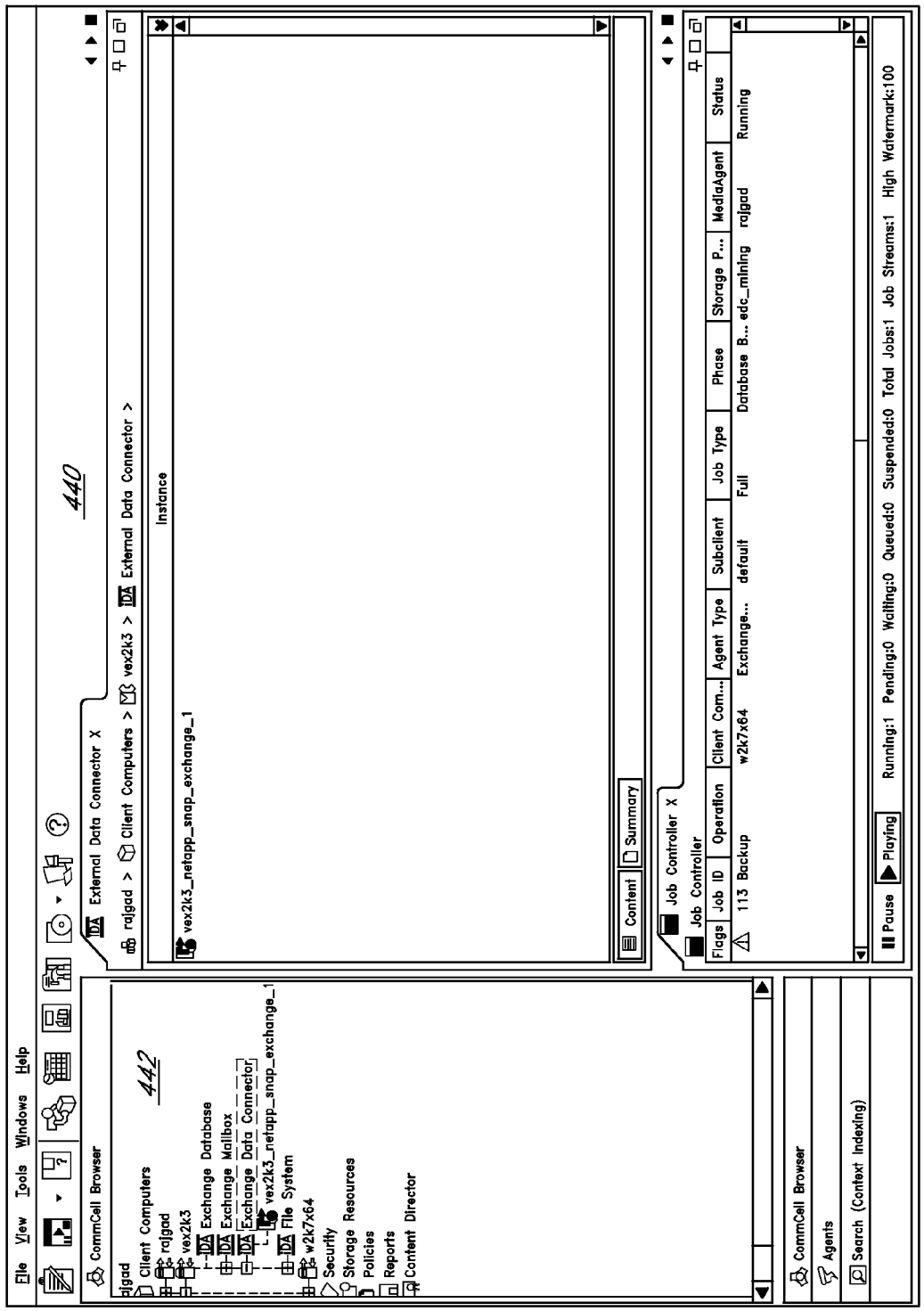
FIGS. 4B through 4F illustrate exemplary screen displays usable with the user interface of the information management system of FIG. 1.

For example, FIGS. 4B-4F illustrate exemplary screen displays usable with the user interface 108 of the information management system 100 of FIG. 1. In particular, FIG. 4B shows an exemplary screen display 440 for receiving and displaying information to a user regarding the information management system 100. For instance, a side browser window 442 lists a plurality of client devices 104 that are associated with the information management system 100, namely "rajgad," "vexsk3," and "w2k7x64."

Each of these client devices 104 further comprises data that is manageable by the information management console 102 through one or more data connectors 106. For instance, client device "vex2k3" further comprises multiple types of data stored thereon, including at least EXCHANGE database, EXCHANGE mailbox and file system data. The browser window 442 further illustrates that a data connector 106 (i.e., "vex2k3_netapp_snap_exchange_1") for obtaining information regarding a NETAPP snapshot of EXCHANGE data on the "vex2k3" client device.

Lower browser window 444 further displays information regarding one or more jobs being executed with respect to data of the client devices 104. For instance, the window 444 illustrates details regarding a backup operation being managed by the information management console 102 with respect to EXCHANGE data stored on the "w2k7x64" client device.

Figure 4C:
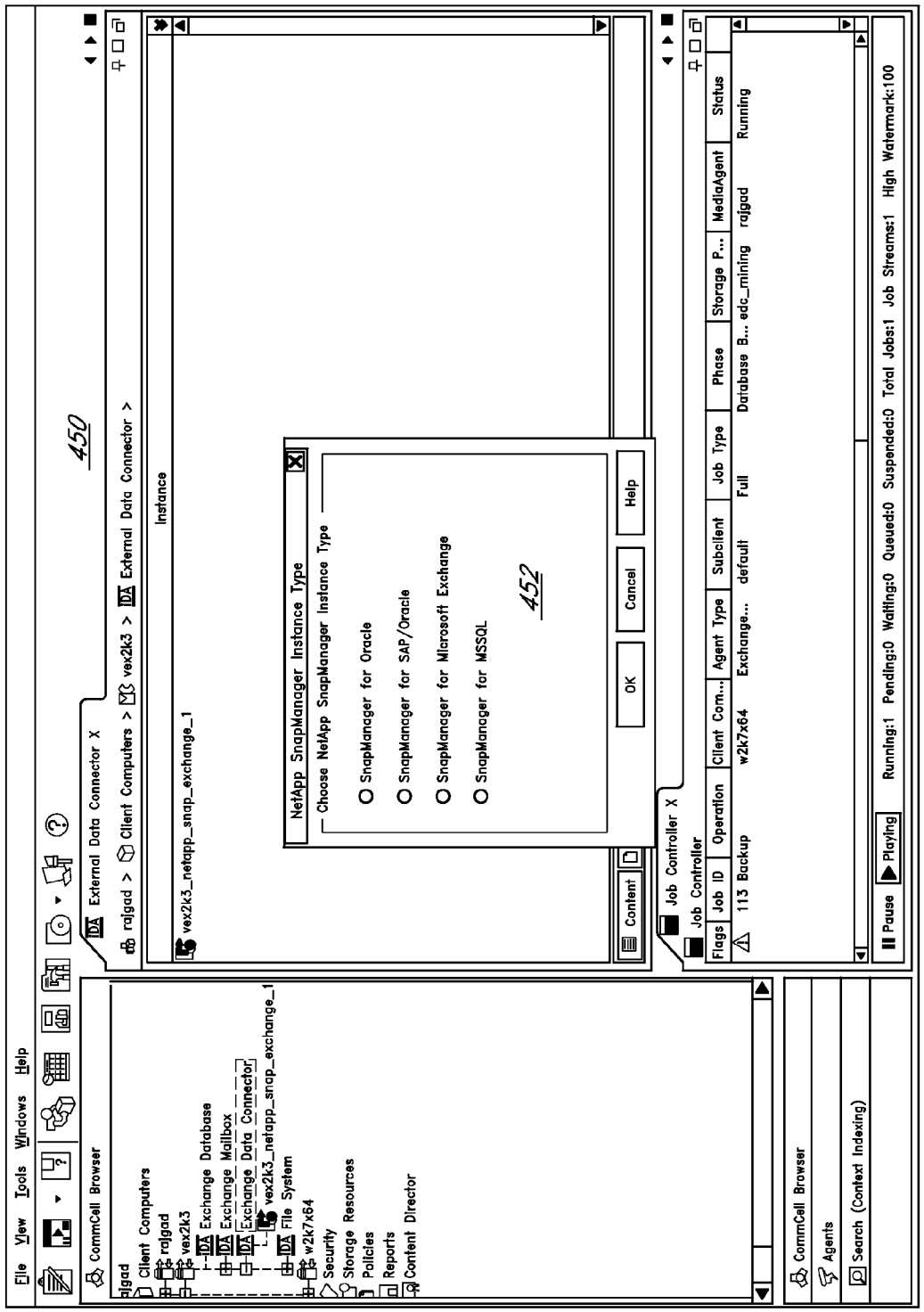
Figure 4D:
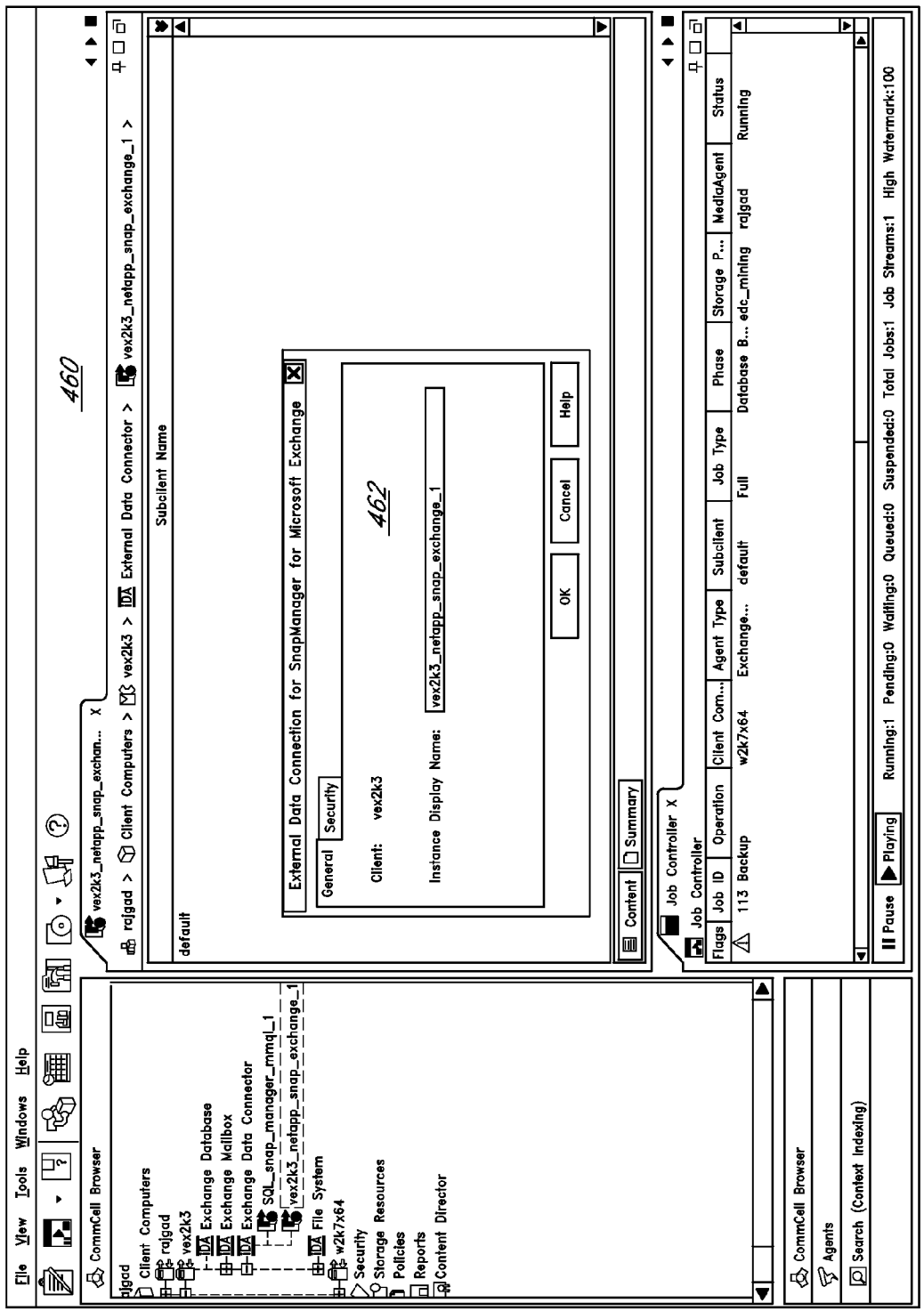

FIG. 4C shows an exemplary screen display 450 further illustrating a dialog box 452 for selecting a particular data connector 104 for data of a client device 104. FIG. 4D shows an exemplary screen display 460 further illustrating a dialog box 462 for configuring properties with respect to a selected data connector 106. For instance, the dialog box 462 can receive configuration information usable to extract, access, process, mine or otherwise manipulate data on the client devices 104.

Figure 4E:
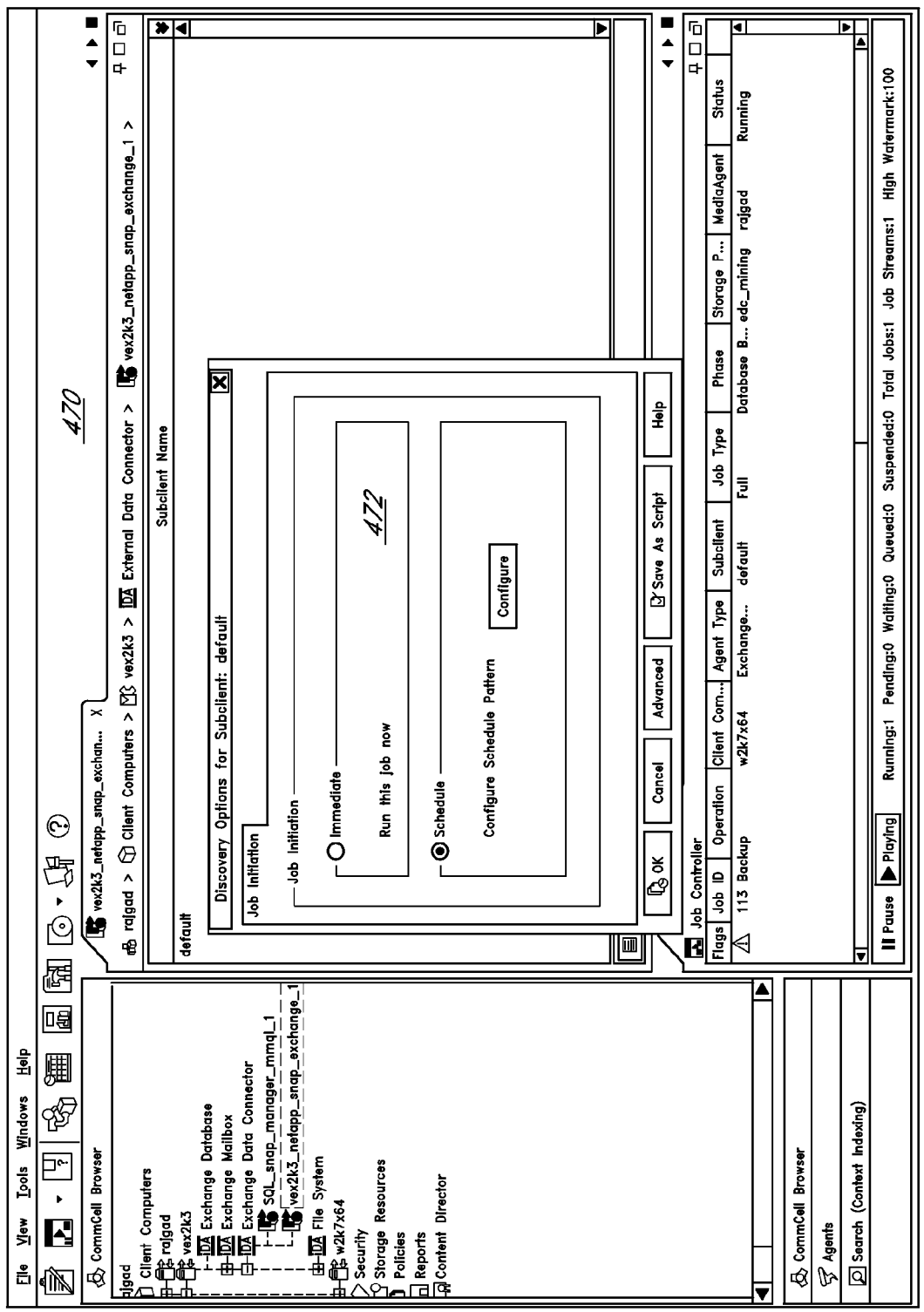

FIG. 4E illustrates an exemplary screen display 470 including a dialog box 472 for managing and/or scheduling one or more jobs with respect to data on the client device 104. For example, the dialog box 472 can be used to perform one or more storage operations on data of one or more of the heterogeneous client devices 104, including, for example, backup operations, snapshot operations, archive operations, information lifecycle operations, combinations of the same or the like.

Figure 4F:
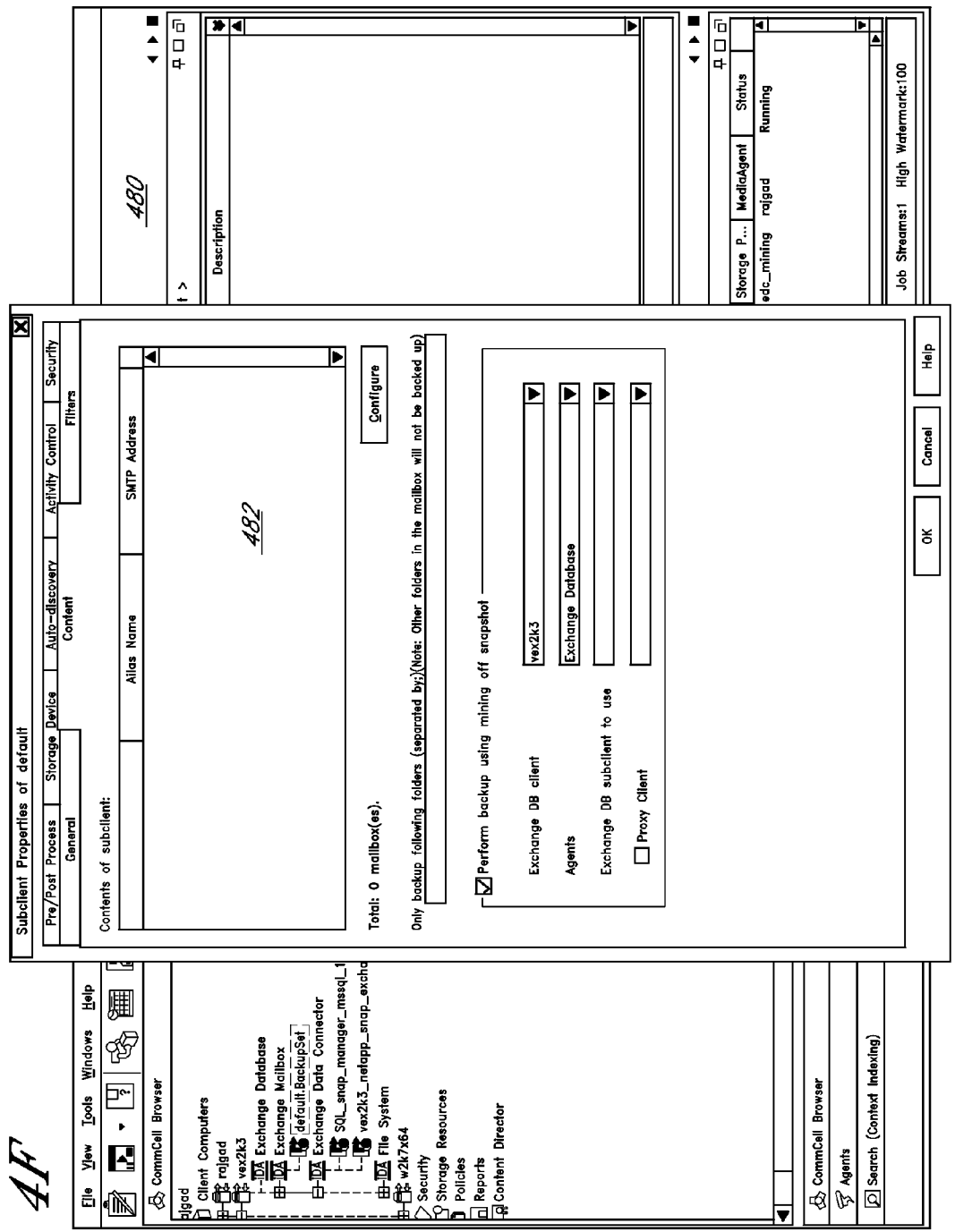

FIG. 4F shows an exemplary screen display 480 further illustrating a dialog box 482 for configuring properties with respect to managing data on a particular client device (i.e., the EXCHANGE mailbox on the "vex2k3" client device). For instance, the dialog box can be used to obtain information and/or instructions for mining data on the client device(s) 104.

Figure 5:
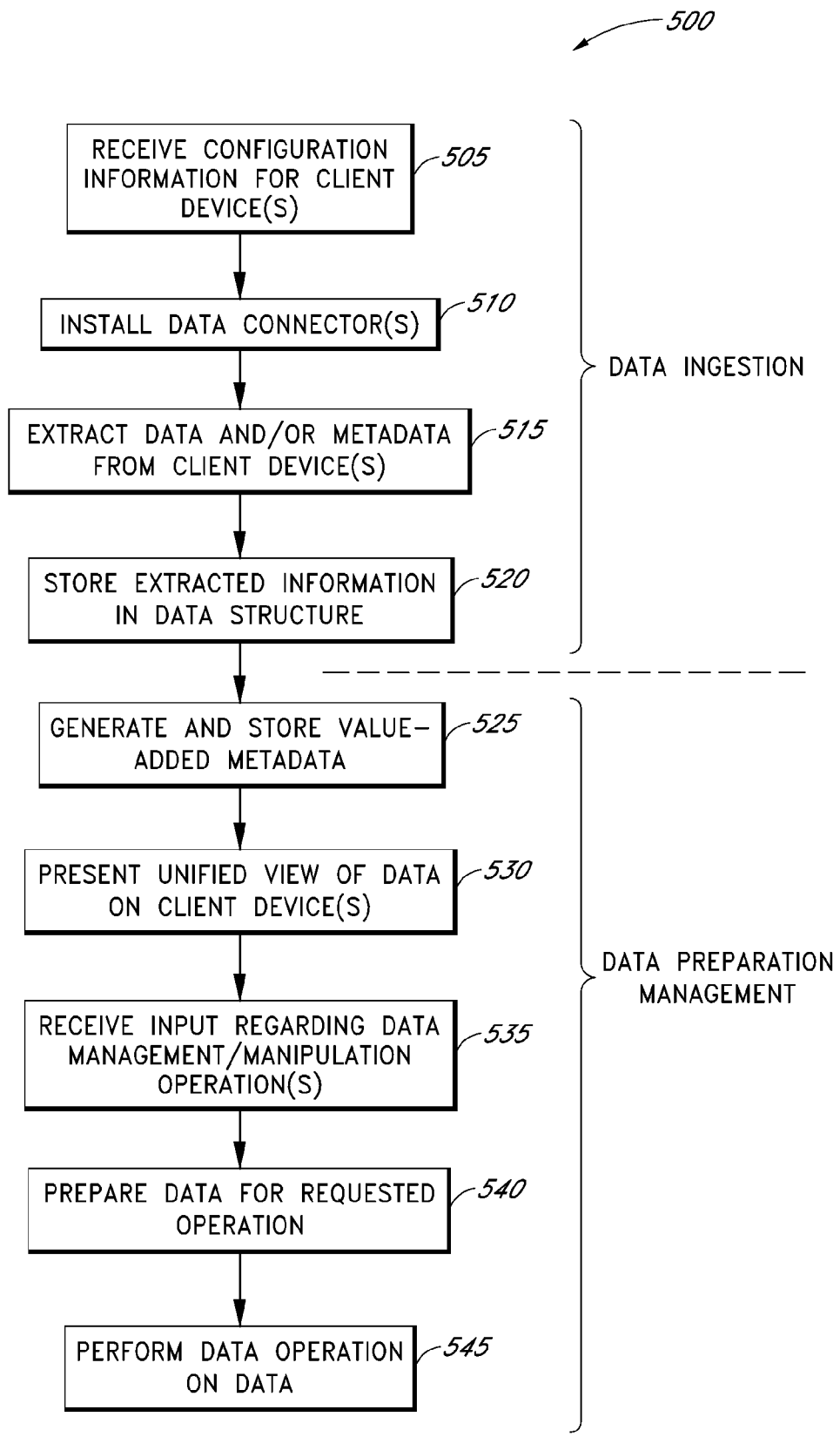
FIG. 5 illustrates a flowchart of an exemplary process for managing data with the information management system of FIG. 1.

FIG. 5 illustrates a flowchart of a process 500 for managing data in an information management system having data stored on a plurality of heterogeneous data sources. In summary, the process 500 provides a view of exemplary steps involved in ingesting data from heterogeneous data sources, such as in a variety of backup formats, preparing the data, and managing the data, such as through processing, mining, copying or the like. For exemplary purposes, the process 500 will be described with reference to the components of the information management system 100 of FIG. 1 and the information management console 302 of FIG. 3.

The process 500 begins with the data ingestion procedure, illustrated by Blocks 505 to 520, during which data and/or metadata is extracted from a plurality of heterogeneous client devices 104 in the information management system 100. At Block 505, configuration information is received by the information management console 102 for one or more client devices installed, or being installed, in the information management system 100. In certain embodiments, the configuration information is received from a user or system administrator through the user interface 108. For example, the configuration information may include one or more of the following pieces of information regarding each client device to be installed: instance name, security information, authentication information (e.g., username and/or password), combinations of the same or the like. In yet other embodiments, at least a portion of the configuration information can be automatically obtained from the client device 104 upon installation.

Based on the obtained configuration information, one or more data connectors or agents 106 are installed on the client device(s) 104 (Block 510). As discussed above, in certain embodiments, each connector 106 is customized to handle a particular data format and/or device and is push-installed to the specific client device 104 based on the configuration information. For instance, different data connectors 106 can be associated with SYMANTEC NETBACKUP, MICROSOFT EXCHANGE, and the like.

At Block 515, the data connector(s) 106 extract actual data and/or metadata from the respective client device(s) 104. For simplification purposes, actual data and metadata will be referred to herein with respect to this process 500 as "data." For example, the data connector(s) 106 can read the client device data directly, scrub log files, and/or communicate with one or more APIs and/or native application processes to extract the data.

It will also be appreciated that, although the data extraction process is illustrated in a single block, the data extraction can proceed on a continuous, periodic, and/or requested basis as data on the client device 104 is modified. Thus, Block 515 may continue concurrently with subsequent blocks of the process 500. For instance, upon the initial scan of the client device 104 following installation, the data extraction process may be relatively resource- and time-intensive, but following the initial scan, subsequent data extraction may be lighter or non-existent (e.g., for decommissioned client devices 104).

At Block 520, the data connector 106 stores the extracted data in the normalized data structure(s) 109, such as an XML file managed by the information management console 102.

Subsequent Blocks 525 to 545 illustrate the preparation and management of the extracted data. At Block 525, the process 500 generates and stores value-added data in the normalized data structure 109. For instance, the data connector 104 and/or information management console 102 can supplement additional metadata to the data structure 109 regarding the extracted data, wherein the additional metadata is non-native to the application that originally generated the extracted data.

At Block 530, the process 500 presents a unified view through the user interface 108 of the data stored on the various, heterogeneous client devices 104. In certain embodiments, the unified view is based on the normalized information stored in the data structure 109, which includes both extracted data and value-added data. In certain embodiments, the normalized data in the data structure 109 advantageously provides a means for executing a query with respect to data of multiple, heterogeneous client devices, rather than querying each device independently.

At Block 535, the information management console 102 receives input regarding a desired data management utility or processing operation. For instance, the input can be indicative of one or more of the following: data mining, archiving, stubbing, data migration, content indexing, document level backup mining (e.g., for non-backup servers such as SHAREPOINT, SQL, EXCHANGE servers), snapshots, restoring data, searching, combinations of the same or the like. In certain embodiments, the requested operation is based at least in part on one or more rules or policies, such as stored in the management database 110.

Based on the request and the data involved, the information management console 102 prepares the data for the request operation (Block 540). For instance, in certain embodiments, the data request may concern data stored in a snapshot. In such embodiments, the information management console 102 can mount the snapshot and copy the data to a storage medium (e.g., tape), a staging area, the secondary storage 111 or the like.

In yet other embodiments where the subject data is stored on a tape or other media, the data preparation can utilize a proxy server to access the data and transfer a copy of the data to a staging area. In further embodiments, the data preparation can comprise establishing a path to a particular library, folder or other data repository that stores the subject data.

After the data is prepared, if needed, the process 500 performs the requested data operation (Block 545). In the case of restoring data backed up on one of the client devices 104, the process 500 can utilize the native backup application of the client device 104, the corresponding data connector 106, the information management console 102, a customized data agent or the like, to restore the data.

Figure 6:
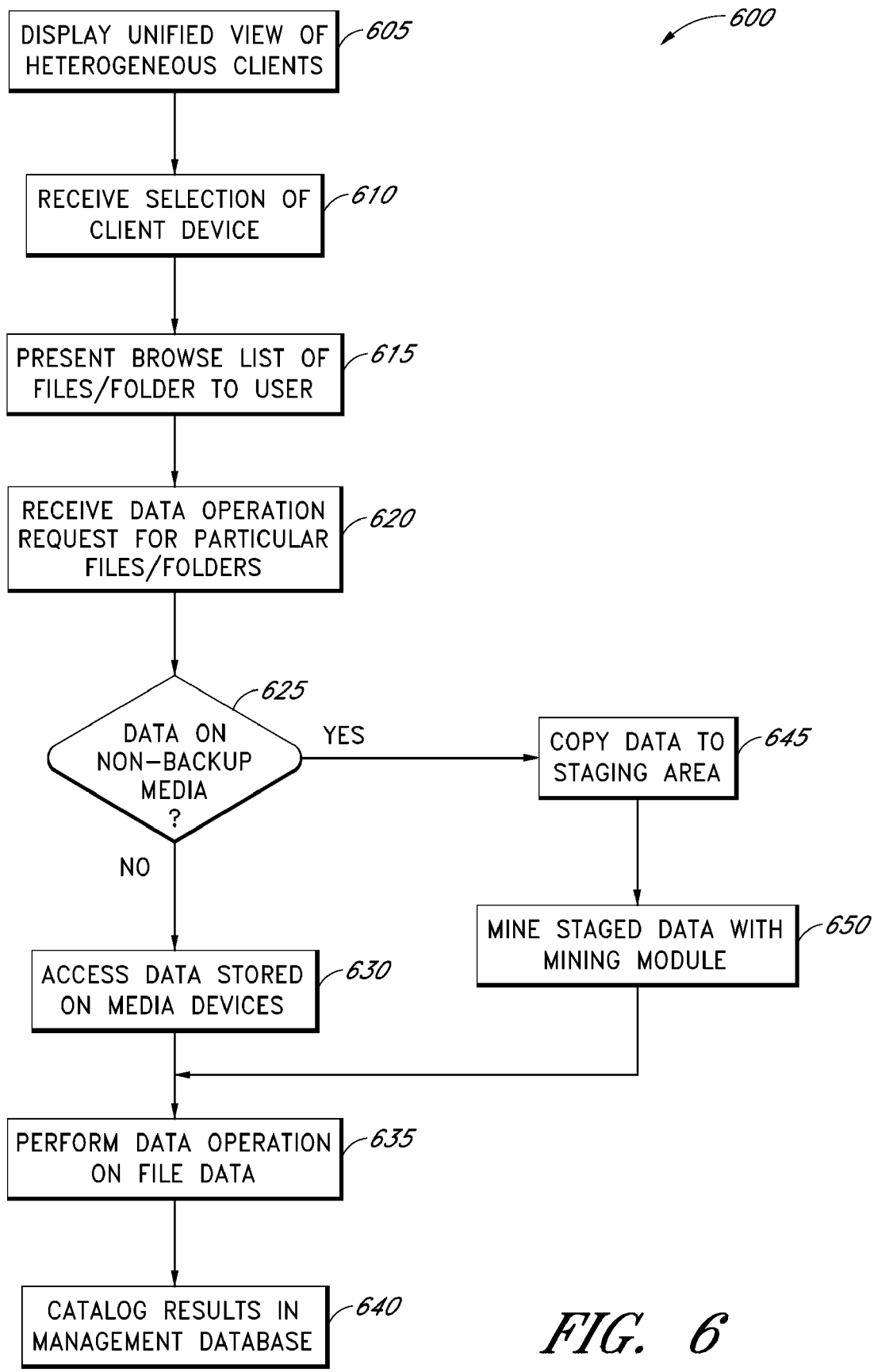
FIG. 6 illustrates a flowchart of an exemplary process for processing data requests with the information management system of FIG. 1.

FIG. 6 illustrates a flowchart of an exemplary process 600 for processing data requests in an information management system. For instance, the process 600 expands on Blocks 530 to 545 of the management process 500 of FIG. 5. In summary, the process 600 allows a user to perform one or more operations on data stored on one or more client devices through a common information management console. For exemplary purposes, the process 600 will be described with reference to the components of the information management system 100 of FIG. 1 and the information management console 302 of FIG. 3.

The process 600 begins at Block 605, wherein the user interface 108 displays a unified view of a plurality of heterogeneous client devices 104. In certain embodiments, the client devices 104 comprise at least multiple devices that are associated with different backup applications or vendors. For instance, the client devices 104 can comprise servers that back up data to a plurality of storage media at the same or different locations. In yet further embodiments, the client devices 104 can comprise database servers and/or non-backup servers, such as an EXCHANGE server, a SHAREPOINT server, SQL SERVER, combinations of the same or the like.

In certain embodiments, the user interface 108 advantageously displays graphical representations, such as icons, of the client devices 104 (e.g., icons) and/or available data management operations in a unified view, such as via a single window (see, for example, menu 400 of FIG. 4A). In further embodiments, the user interface 108 can display information regarding the client devices 104 and/or the data stored thereon, such as for example, media type, storage format, storage costs (actual and/or predicted), storage allocation (actual and/or predicted), combinations of the same or the like.

At Block 610, the user interface 108 receives a selection of at least one of the client devices 104. For instance, such a selection may be made by a user clicking on an icon representing the particular client device 104 in the information management system 100. At Block 615, the user interface 108 displays the files, folders, databases, or other data elements that are stored on the selected client device 104. In certain embodiments, the display is in the form of a list, a tree structure or the like.

At Block 620, the process 600 receives a request to perform a data operation on one or more data elements of the selected client device(s) 104. In certain embodiments, the data request is received from a user via the user interface 108. In yet other embodiments, the data request is automatically generated based on one or more storage policies, schedules, user preferences or the like. In certain embodiments, the request may concern a request to restore data that has been backed up by one or more client devices 104. In other embodiments, the request can comprise performing one or more of the following data operations: archive, backup, copy, search, classify, browse or the like.

It should be appreciated that, although Blocks 605, 610, 615 and 620 are shown and described with reference to separate acts, one or more of the aforementioned blocks can be combined into a single block or act. For instance, in certain embodiments of the process 600, a requested data operation can identify a client device 104 and/or one or more data elements on the client device 104 that are the subject of the data operation without requiring the process 600 to receive a separate selection of the client device 104 (Block 610) or to display the files and/or folders of the client device 104 (Block 615).

At Block 615, the information management console 302 determines if the data operation request concerns data that is on a non-backup media (e.g., a database). For instance, in certain embodiments, the information management console 302 can access information stored in the management database 110 to determine the format(s) of the subject data. In yet other embodiments, the data connectors 106 can be configured to determine what type of data in on the client devices 104.

If the data request concerns a backup medium, the information management console 302 accesses the device(s) storing the data (Block 630). For instance, the information management console 302 can mount, if needed, a particular media device and read the backed up data stored thereon. In yet other embodiments, the information management console 302 can access the data on the device through a proxy server, a network path or other means.

At Block 635, the information management console 302 performs the requested data operation. For instance, in the case of a restore operation, the restore module 328 can access backed up or archived data to restore the data to a workable format. In yet other embodiments, the restore module 328 can utilize a data connector 106 and/or a native application of the client device to restore the data.

At Block 640, the results of the request operation can be optionally stored in a memory, such as in the management database 110, for future use by the user and/or the information management console 302. For example, the cataloged information can be subsequently used to locate and archive certain data from the media devices according to one or more storage policies (e.g., retention policies).

If at Block 625 the information management console 302 determines that the data of interest is on non-backup media, the process 600 moves to Block 645. For instance, such data can comprise databases related to applications such as EXCHANGE, SHAREPOINT, ACTIVE DIRECTORY or the like. In such situations, the mining module 330 of the information management console 302 copies the data to a staging area to unravel the database down to its individual elements (e.g., mailboxes, email messages, storage accounts, user accounts, etc.) (Block 650).

In certain embodiments, Blocks 645 and/or 650 comprise decrypting and/or decompressing the non-backup data. In yet further embodiments, the process 600 can comprise using a proxy to restore the data. For example, copying and mining the data can comprise emulating the native application (e.g., EXCHANGE, ORACLE) relating to the data of the particular files/folders being copied to the staging area. In certain embodiments, such emulation includes presenting a user interface and/or one or more APIs to access and/or manipulate the data as if the native application was installed on the proxy machine(s). However, instead of maintaining the data in the native format, once it is processed, the data can advantageously be converted into a file format that is more easily managed.

The processes described above can be especially advantageous in embodiments of the invention wherein vendors periodically change their file formats and/or the file format is decommissioned. For instance, by emulating the native application on a proxy machine, the system is not required to maintain copies of new versions of the native application each time the application changes.

Following Block 630, the process 600 continues with Block 635 to perform the requested data operation.

Figure 7:
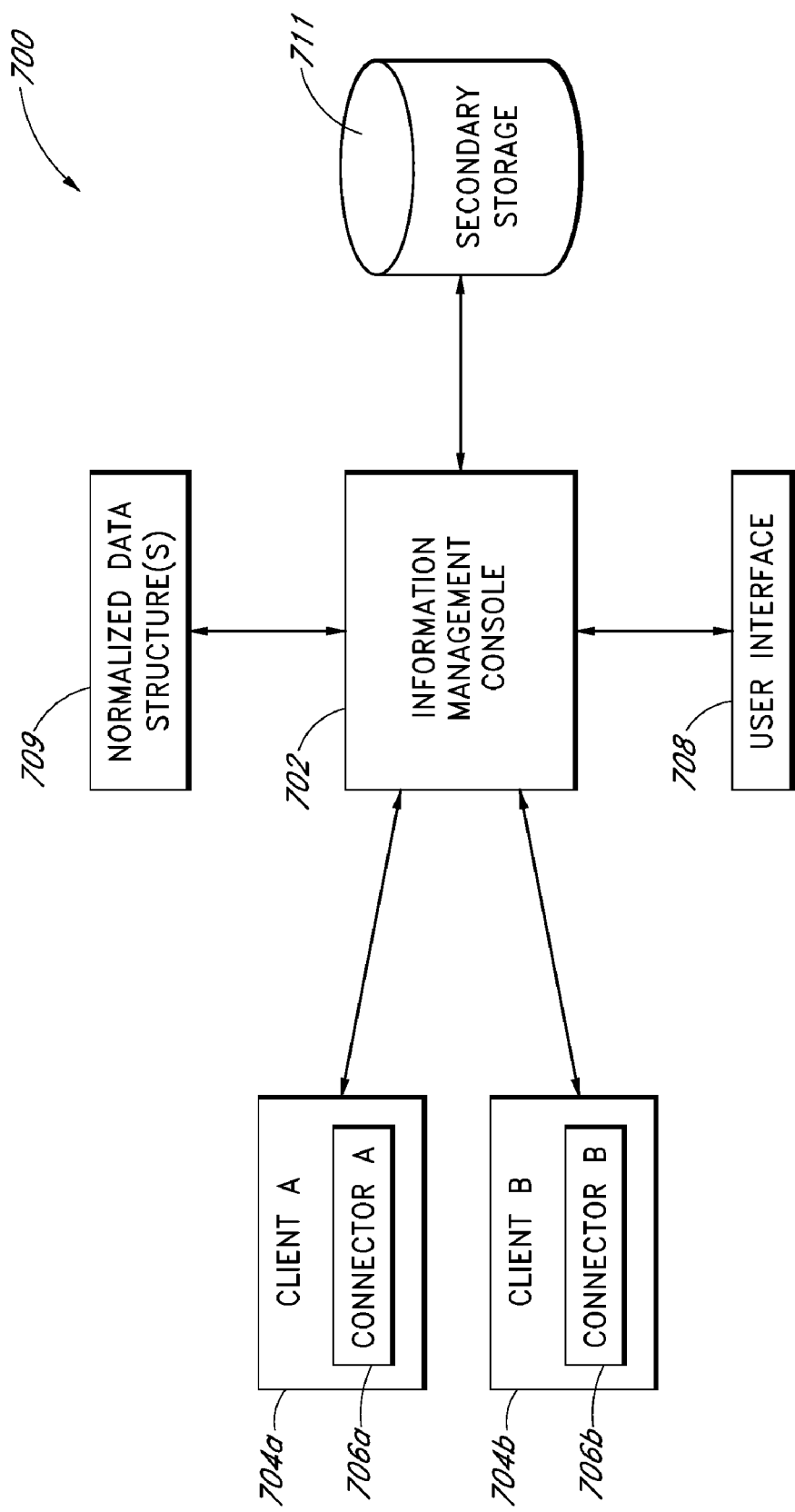
FIG. 7 illustrates an exemplary block diagram of an information management system for merging disparate data of multiple client devices, according to certain embodiments of the invention.

FIG. 7 illustrates an exemplary block diagram of an information management system 700 for combining disparate data of multiple client devices, according to certain embodiments of the invention. For instance, the information management system 700 can be configured to access data in different formats on different client devices and run or more common jobs on the data. For exemplary purposes, the system 700 will be described with respect to performing migration operations on the client data in different backup formats. However, it will be understood that the system 700 can be configured to perform other types of data management operations, including, but not limited to, backup, archive, snapshot and like operations.

As shown, an information management console 702 communicates with a client A 704a via a data connector 706a and a client B 704b via a data connector 706b. In certain embodiments, client device 704a comprises data in a first backup format, and client device 704b comprises data in a second backup format. Moreover the first and second backup formats can comprise different properties such that a native application operating in accordance with the first backup format is not capable of working with the second backup format. For example, the first backup format may comprise a NETBACKUP backup format, while the second backup format may comprise a NETWORKER backup format.

According to the methods previously discussed herein, the information management console 702 can receive metadata from each of the client devices 704a, 704b via the connectors 706a, 706b for storage in one or more normalized data structures 709, examples of which are illustrated in FIGS. 2A-2D. For instance, the console 702 can populate various fields of the data structure(s) 709 with metadata received from the connectors 706a, 706b. For instance, such fields may dictate the last access and/or modified time of the client data.

Moreover, the console 702 can further populate the data structure(s) 709 with additional, value-added data generated by the console 702. For instance, information regarding the cost of a particular medium occupied by the data and/or the overall storage capacity of the medium can be added to the data structure 709. In such embodiments, the data structure 709 storing the metadata for the data in first backup format (i.e., on the client device 704a) has the same fields and/or structure as the data structure 709 storing the metadata for the data in second backup format (i.e., on the client device 704b).

The information management console 702 can further maintain and/or access one or more storage policies, jobs or other scheduled operations for manipulating and/or extracting data from both the client devices 704a, 704b. In certain embodiments, the console 702 is configured, according to one or more storage retention policies, to migrate backup data that has not been accessed for a particular period of time. In such embodiments, when the threshold time has passed, the information management console 702 can instruct the connectors 706a, 706b to obtain and send the backup data to the console 702. In certain embodiments, each of the connectors 706a, 706b can access the data in the first and second backup formats, respectively, via one or more published APIs.

Based on the metadata available from the data structure 709, the information management console 702 can store the backup data acquired from the two client devices 704a, 704b to the same secondary storage, such as a tape drive. Such is especially advantageous in systems attempting to reduce the costs of primary storage (e.g., on the client device(s) 104)). For example, a storage retention policy can be established to migrate data from more expensive storage media (e.g., a NetApp filer or NAS) device to a less expensive storage media (e.g., tape) after a predetermined period of time.

In certain further embodiments, the information management console 702 can further provide one or more reports via a user interface 708 regarding costs of storage within the information management system 700. For instance, the user interface 708 can be configured to display a pie chart or other visual representation of a cost per unit of storage (e.g., dollars per gigabyte) for the various client devices 704a, 704b within the system 700. Based on these reports, the user can be informed how much storage is costing and/or predicted to cost and be provided with the option of establishing storage criteria for managing the migration of data within the system 700. Various other reports can be provided.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein.

Embodiments of the invention are also described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions, which execute on the computer or other programmable apparatus, provide steps for implementing the acts specified in the flowchart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A method for managing data in a computer system, the method comprising:
    performing, by a first data connector, a discovery of data associated with a first client computing device to obtain first data in a first backup file format from first media, the first backup file format associated with a first data backup application executing on the first client computing device, the first data being associated with a first payload and first metadata;
    receiving the first payload and the first metadata from the first data connector by a management console executing on one or more computer processors;
    processing, by the management console, the first payload to generate second metadata different than said first metadata;
    storing in a data structure the second metadata and at least a portion of the first metadata in a first entry associated with the first media;
    performing, by a second data connector, a discovery of data associated with a second client computing device to obtain second data in a second backup file format from second media, the second backup file format different than the first backup file format and associated with a second data backup application different than the first data backup application, the second data backup application executing on the second client computing device, the second data being associated with a second payload and third metadata;
    receiving the second payload and the third metadata from the second data connector by the management console;
    processing, by the management console, the second payload to generate fourth metadata different than said third metadata;
    storing in the data structure the fourth metadata and at least a portion of the third metadata in a second entry associated with the second media; and
    presenting the first and second entries in a unified view of a user interface.

2. The method of claim 1, wherein the second metadata and the fourth metadata concern the same data characteristics.

3. The method of claim 1, wherein the first metadata and the third metadata concern different data characteristics.

4. The method of claim 1, wherein at least one of the first and second media comprises tape media.

5. The method of claim 1, wherein at least one of the first and second media comprises a database.

6. The method of claim 1, additionally comprising storing a portion of the first payload and a portion of the second payload in a single file.

7. The method of claim 1, additionally comprising storing a portion of the first payload and a portion of the second payload in a common data format.

8. The method of claim 1, wherein the data structure comprises an Extensible Markup Language (XML) file.

9. The method of claim 1, additionally comprising:
    receiving a data operation request with respect to the first data of the first media; and
    performing the data operation directly on the first data of the first media.

10. A system for managing data from a plurality of heterogeneous client devices, the system comprising:
    a first data connector configured to perform a discovery of data associated with a first client device to obtain first data in a first backup file format from the first client device, the first backup file format associated with a first data backup application executing on the first client device, the first data having a first payload and first metadata associated with the first payload;
    a second data connector configured to perform a discovery of data associated with a second client device to obtain second data in a second backup file format from the second client device, the second backup file format associated with a second data backup application different than the first data backup application, the second data backup application executing on the second client device, the second data having a second payload and second metadata associated with the second payload;
    a management module executing on a computing device in communication with the first and second data connectors to receive the first and second payloads and first and second metadata, the management module configured to process the first payload to generate third metadata different than said first metadata and to process the second payload to generate fourth metadata different than said second metadata; and a data structure configured to store the third metadata and at least a portion of the first metadata in a first entry associated with the first client device and to store the fourth metadata and at least a portion of the second metadata in a second entry associated with the second client device.

11. The system of claim 10, additionally comprising a user interface in communication with the management module to present the first and second entries in a unified view.

12. The system of claim 10, wherein the data structure comprises at least one Extensible Markup Language (XML) file.

13. The system of claim 10, wherein the first data connector is further configured to obtain third data in the first backup file format from a third client device.

14. The system of claim 10, further comprising a third data connector configured to obtain third data in a third file format from at least one of the first and second client devices.

15. A system for managing data from a plurality of heterogeneous client devices, the system comprising:

first means for performing a discovery of data associated with a first client computing device to obtain first data in a first backup file format from the first client computing device, the first backup file format associated with a first data backup application executing on the first client computing device, the first data having a first payload and first metadata associated with the first payload, the first means comprising a first data connector;

second means for performing a discovery of data associated with a second client computing device to obtain second data in a second backup file format from the second client computing device, the second backup file format different than the first backup file format and associated with a second data backup application different than the first data backup application, the second data backup application executing on the second client computing device, the second data having a second payload and second metadata associated with the second payload, the second means comprising a second data connector;

means for receiving the first and second payloads and first and second metadata and for processing the first payload to generate third metadata different than said first metadata and to process the second payload to generate fourth metadata different than said second metadata; and means for storing the third metadata and at least a portion of the first metadata in a first entry associated with the first client computing device and to store the fourth metadata and at least a portion of the second metadata in a second entry associated with the second client computing device.

16. The system of claim 15, further comprising means for displaying via a unified interface on-screen graphics indicative of the first and second client computing devices.

* * * * *